United States Patent
Jeon et al.

(10) Patent No.: US 11,190,811 B2
(45) Date of Patent: Nov. 30, 2021

(54) IMAGE DISPLAY METHOD AND ELECTRONIC DEVICE THEREFOR

(71) Applicant: SAMSUNG ELECTRONICS CO., LTD., Suwon-si (KR)

(72) Inventors: Kang-won Jeon, Seoul (KR); Min-su Cheon, Seoul (KR); Mun-kyeong Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 9 days.

(21) Appl. No.: 16/340,816

(22) PCT Filed: Sep. 29, 2017

(86) PCT No.: PCT/KR2017/011023
§ 371 (c)(1),
(2) Date: Apr. 10, 2019

(87) PCT Pub. No.: WO2018/074768
PCT Pub. Date: Apr. 26, 2018

(65) Prior Publication Data
US 2019/0268625 A1    Aug. 29, 2019

(30) Foreign Application Priority Data

Oct. 20, 2016 (KR) .................. 10-2016-0136574
Dec. 7, 2016 (KR) .................. 10-2016-0166213

(51) Int. Cl.
| | |
|---|---|
| *H04N 21/218* | (2011.01) |
| *H04N 21/4728* | (2011.01) |
| *H04N 21/858* | (2011.01) |
| *H04N 21/6587* | (2011.01) |
| *H04N 21/422* | (2011.01) |

(52) U.S. Cl.
CPC . *H04N 21/21805* (2013.01); *H04N 21/42202* (2013.01); *H04N 21/4728* (2013.01); *H04N 21/6587* (2013.01); *H04N 21/8586* (2013.01)

(58) Field of Classification Search
None
See application file for complete search history.

(56) References Cited

U.S. PATENT DOCUMENTS

| | | |
|---|---|---|
| 5,745,126 A | 4/1998 | Jain et al. |
| 7,532,224 B2 | 5/2009 | Bannai |
| | (Continued) | |

FOREIGN PATENT DOCUMENTS

| | | |
|---|---|---|
| CN | 105607882 | 5/2016 |
| EP | 2 940 993 | 11/2015 |
| | (Continued) | |

OTHER PUBLICATIONS

Extended Search Report dated Aug. 2, 2019 in counterpart European Patent Application No. 17863189.1.
(Continued)

*Primary Examiner* — James R Marandi
(74) *Attorney, Agent, or Firm* — Nixon & Vanderhye, P.C.

(57) ABSTRACT

Provided is an electronic device including a communication unit configured to receive data from a server, a display unit configured to display a first video obtained by photographing a plurality of objects having cameras mounted thereon, or second videos obtained by the objects, an input unit configured to receive a user input, and a controller configured to display the first video on the display unit, receive a user input for selecting at least one of the plurality of objects included in the first video, through the input unit, and control the display unit to display a second video obtained by the selected object, on a part or entirety of the display unit based on the user input.

9 Claims, 18 Drawing Sheets

(56) References Cited

U.S. PATENT DOCUMENTS

| | | | |
|---|---|---|---|
| 9,210,361 | B2 | 12/2015 | Todd |
| 9,236,032 | B2 | 1/2016 | Choi et al. |
| 9,364,747 | B2* | 6/2016 | Meyer ................ A63F 13/5255 |
| 2006/0227151 | A1 | 10/2006 | Bannai |
| 2008/0129825 | A1* | 6/2008 | DeAngelis ......... H04N 5/23299 |
| | | | 348/169 |
| 2010/0026809 | A1 | 2/2010 | Curry |
| 2011/0090347 | A1 | 4/2011 | Buckner et al. |
| 2012/0316843 | A1* | 12/2012 | Beno .................. G06Q 10/0639 |
| | | | 703/2 |
| 2013/0066448 | A1* | 3/2013 | Alonso .................... H04Q 9/00 |
| | | | 700/91 |
| 2013/0176401 | A1 | 7/2013 | Monari et al. |
| 2013/0329048 | A1 | 12/2013 | Wang |
| 2015/0172605 | A1 | 6/2015 | Anwar et al. |
| 2016/0099025 | A1 | 4/2016 | Anwar et al. |
| 2016/0142703 | A1* | 5/2016 | Park ....................... G09G 3/001 |
| | | | 348/39 |
| 2016/0143370 | A1 | 5/2016 | Ildefonso Huertas |
| 2018/0048821 | A1* | 2/2018 | Segapelli ........... H04N 5/23267 |

FOREIGN PATENT DOCUMENTS

| | | |
|---|---|---|
| JP | 2006-293604 | 10/2006 |
| JP | 4293736 | 7/2009 |
| JP | 5920708 | 5/2016 |
| KR | 10-2003-0009968 | 2/2003 |
| KR | 10-2013-0070035 | 6/2013 |
| KR | 10-2015-0030993 | 3/2015 |
| KR | 10-2015-0066941 | 6/2015 |
| KR | 10-1614919 | 4/2016 |
| WO | 2014/198987 | 12/2014 |

OTHER PUBLICATIONS

Search Report dated Dec. 27, 2017 in counterpart International Patent Application No. PCT/KR2017/011023 and English-language translation thereof.

Written Opinion of the International Searching Authority dated Dec. 27, 2017 in counterpart International Patent Application No. PCT/KR2017/011023 and English-language translation thereof.

"Gopro and Vislink Partnership for Wireless Live HD Broadcasting," https://ko.gopro.com/news/gopro-partners-with-vislink-for-live-wireless-hd-broadcast (Jan. 14, 2015) (5 pages).

"First V1sion Adds a True Player's Perspective to Sports Broadcasts," http://www.sporttechie.com/first-v1sion-adds-a-true-players-perspective-to-sports-broadcasts/ (Jan. 22, 2015) (6 pages).

First Office Action dated Oct. 30, 2020 in counterpart Chinese Patent Application No. 201780066853.7 and English-language translation.

Examination Report dated Oct. 31, 2020 in counterpart India Patent Application No. 201927019292 and English-language translation.

* cited by examiner

IMAGE DISPLAY METHOD AND ELECTRONIC DEVICE THEREFOR

This application is the U.S. national phase of International Application No. PCT/KR2017/011023 filed Sep. 29, 2017 which designated the U.S. and claims priority to KR Patent Application No. 10-2016-0136574 filed Oct. 20, 2016 and KR Patent Application No. 10-2016-0166213 filed Dec. 7, 2016, the entire contents of each of which are hereby incorporated by reference.

TECHNICAL FIELD

The present disclosure relates to a method of displaying, on a screen, a video obtained from a viewpoint of a camera selected by a user from among videos obtained by a plurality of cameras.

DESCRIPTION OF RELATED ART

Currently, a video may be obtained from a viewpoint of a user by mounting a small camera on a body part of the user. Such a video is called a first-person video, and such first-person videos are shared particularly on the Internet and attract much attention.

Adoption of first-person videos is considered in sport games, and thus development of a technology for effectively providing, to users, videos obtained from viewpoints of players is required.

SUMMARY

Provided is a method of displaying, on a screen, a video obtained from a viewpoint of a desired person who is selected by a user, to provide, to the user, a video obtained from a viewpoint of a player participating in a sport game or a performer taking part in a performance.

DETAILED DESCRIPTION OF EXAMPLE EMBODIMENTS

Figure 1:
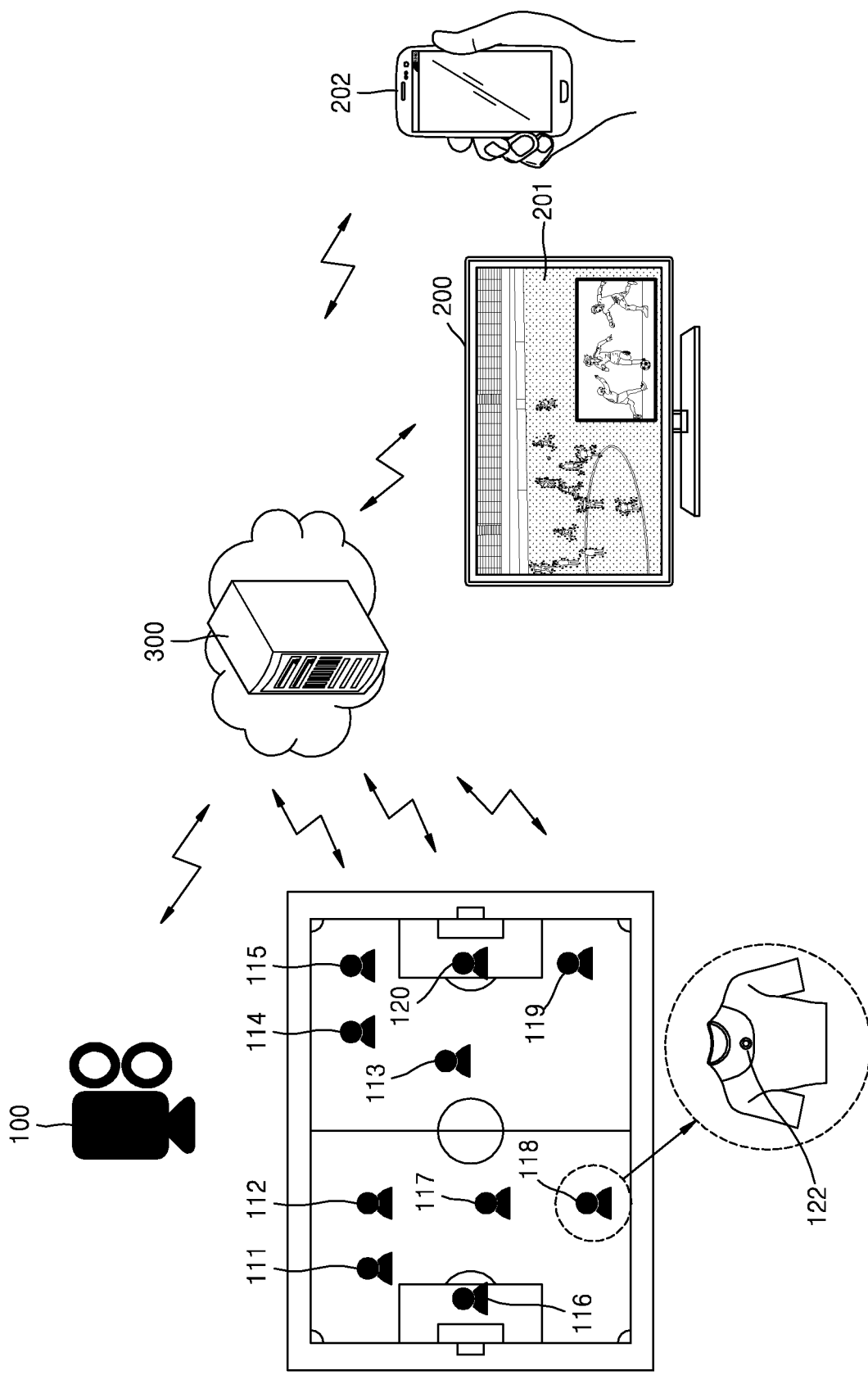
FIG. 1 is a diagram showing the configuration of a system according to an example embodiment of the present disclosure.

In accordance with an aspect of the disclosure, a video display method of an electronic device includes displaying, on a display unit, a first video obtained by photographing a plurality of objects having cameras mounted thereon, receiving a user input for selecting at least one of the plurality of objects displayed on the display unit, and displaying a second video obtained by the selected object, on a part or entirety of the display unit based on the user input.

The method may further include displaying, on the display unit, a user interface (UI) corresponding to the object and the camera mounted on the object, and the receiving of the user input may include receiving the user input through the UI.

The UI may be displayed on the display unit based on UI information transmitted from a server.

The UI may include at least one of uniform resource locator (URL) information of the second video and identifier (ID) information of the camera mounted on the object.

The second video may be obtained by stabilizing video data transmitted from the camera mounted on the object, by using motion information output from a sensor unit of the camera.

A display location of the UI on the display unit may be determined based on location information of the camera mounted on the object.

The method may further include displaying a third video including the selected object, on a part or entirety of the display unit based on the user input by finding the third video based on location information of the camera mounted on the selected object and location information of cameras mounted on other objects located adjacent to the object.

In accordance with another aspect of the disclosure, a video data processing method of a server includes receiving, from cameras mounted on a plurality of objects, video data, motion and location information generated based on motion of the cameras, and identifier (ID) information of the cameras, stabilizing the video data based on the motion information, and generating a second video, generating user interface (UI) information for selecting the second video, based on the ID information, and transmitting the UI information to an electronic device.

The method may further include receiving a user input for selecting one of a plurality of UIs, from the electronic device, and transmitting a second video corresponding to the selected UI, to the electronic device based on the received user input.

The method may further include finding a second video including a specific object among the plurality of objects, based on location information and direction information of the plurality of cameras.

In accordance with another aspect of the disclosure, an electronic device includes a communication unit configured to receive data from a server, a display unit configured to display a first video obtained by photographing a plurality of objects having cameras mounted thereon, or second videos obtained by the objects, an input unit configured to receive a user input, and a controller configured to display the first video on the display unit, receive a user input for selecting at least one of the plurality of objects included in the first video, through the input unit, and control the display unit to display a second video obtained by the selected object, on a part or entirety of the display unit based on the user input. Herein, the controller may be further configured to control the display unit to display a user interface (UI) corresponding to the object or the camera mounted on the object, and receive the user input through the UI.

The UI may be displayed on the display unit based on UI information transmitted from a server.

The UI may include at least one of uniform resource locator (URL) information of the second video and identifier (ID) information of the camera mounted on the object.

The second video may be obtained by stabilizing video data transmitted from the camera mounted on the object, by using motion information output from a sensor unit of the camera.

A display location of the UI on the display unit may be determined based on location information of the camera mounted on the object.

The controller may be further configured to control the display unit to display a third video including the selected object, on a part or entirety of the display unit based on the user input by finding the third video by using location information of the camera mounted on the selected object and location information of cameras mounted on other objects located adjacent to the object.

In accordance with another aspect of the disclosure, a server includes a communication unit configured to receive, from cameras mounted on a plurality of objects, video data, motion and location information generated based on motion of the cameras, and identifier (ID) information of the cameras, and a controller configured to stabilize the video data based on the motion information, generate second videos, generate user interface (UI) information for selecting one of the second videos based on the ID information, and transmit the UI information to an electronic device.

The controller may be further configured to receive a user input for selecting one of a plurality of UIs displayed on a display unit of the electronic device, through the communication unit from the electronic device based on the UI information, and transmit a second video corresponding to the selected UI, to the electronic device based on the received user input.

The second video may be a third video including a specific object among the plurality of objects.

The controller may be further configured to find a third video including a specific object among the plurality of objects, based on location information and direction information of the plurality of cameras, and transmit the third video to the electronic device.

MODE OF DISCLOSURE

Hereinafter, various embodiments will be described in detail with reference to the attached drawings. The embodiments may, however, be embodied in many different forms and should not be construed as being limited to specific embodiments set forth herein; rather, these embodiments covers various modifications, equivalents and/or alternatives. In the drawings, like reference numerals denote like elements.

In this specification, the expression "have", "may have", "include", "may include", "comprise", or "may comprise" indicates the presence of a feature (e.g., a numerical value, a function, an operation, or an element such as a part) and does not exclude the presence of an additional feature.

The expression "A or B", "at least one of A or/and B", or "one or more of A or/and B" may include all possible combinations of the listed items. For example, "A or B", "at least one of A and B", or "at least one of A or B" may refer to all cases in which (1) at least one A is included, (2) at least one B is included, and (3) at least one A and at least one B are both included.

The expressions such as "first", "second", "$1^{st}$", and "$2^{nd}$" used herein may refer to various different elements irrespective of the order and/or priority thereof, and are merely used to distinguish one element from another without limiting the elements. For example, "a first user device" and "a second user device" may indicate different user devices irrespective of the order or priority thereof. Specifically, a first element may be referred to as a second element and, similarly, a second element may be referred to as a first element without departing from the scope of the disclosure.

It will be understood that, when an element (e.g., a first element) is referred to as being "(operatively or communicatively) coupled with/to" or "connected to" another element (e.g., a second element), the element can be coupled or connected to the other element directly or through another element (e.g., a third element). On the contrary, it will be understood that, when an element (e.g., a first element) is referred to as being "directly coupled to" or "directly connected to" another element (e.g., a second element), another element (e.g., a third element) does not exist therebetween.

The expression "configured to" used herein may be interchangeably used with, for example, "suitable for", "having the capacity to", "designed to", "adapted to", "made to", or "capable of" as necessary. The term "configured to" does not always imply "specifically designed to" in a hardware manner. Rather, in some cases, the expression "a device configured to" may imply that the device is "capable of" something together with other devices or parts. For example, "a processor configured to perform A, B, and C" may imply a dedicated processor (e.g., an embedded processor) for performing the operations or a generic-purpose processor (e.g., a central processing unit (CPU) or an application processor (AP)) capable of performing the operations by executing one or more software programs stored in a memory device.

Terms used herein are used to describe specific embodiments, and are not intended to limit the scope of other embodiments. Singular forms are intended to include plural forms as well, unless the context clearly indicates otherwise. Unless defined differently, all terms used in the description including technical and scientific terms have the same meaning as generally understood by one of ordinary skill in the art. Terms as defined in a commonly used dictionary should be construed as having the same meaning as in an associated technical context, and unless defined in the description, the terms are not ideally or excessively construed as having formal meaning. In some cases, even terms defined in this specification cannot be construed to exclude the embodiments.

An electronic device according to various example embodiments of the present disclosure may include at least one of, for example, a television (TV), a smartphone, a tablet personal computer (tablet PC), a mobile phone, an electronic book (e-book) reader, a desktop PC, a laptop PC, a netbook computer, and a workstation.

In the following description, a "screen" may include a "display unit".

'A point-of-view video of a player' may refer to a video obtained by a camera mounted on a player participating in a sport game.

'A point-of-view video of a performer' may refer to a video obtained by a camera mounted on a performer appearing in a performance such as a concert, a ballet, or a play.

A 'mounted camera' may refer to not only a case in which a camera is directly mounted on clothes, a helmet, or a body part of a user but also a case in which a camera is directly held by a player or a performer.

In addition, 'a point-of-view video of a player' or 'a point-of-view video of a performer' may include a video obtained by a third person following the player or the performer. For example, a point-of-view video of a player or a performer may include a video obtained in the perspective of the player or the performer by a camera holder following the player or the performer from behind.

For convenience of explanation, a sport game will be described below as an example but the present disclosure is not limited thereto and may also be applicable to a performance or a program produced using a plurality of cameras.

For convenience of explanation, a camera mounted on clothes of a player or a performer will be described below as an example but the present disclosure is not limited thereto and may also be applicable to not only a case in which a camera is directly mounted on clothes, a helmet, or a body part of a user but also a case in which a camera is held by a user and a case in which a camera is held by a third person following a player or a performer.

FIG. 1 is a diagram showing the configuration of a system according to an example embodiment of the present disclosure.

Referring to FIG. 1, a plurality of cameras 111 to 120, a server 300, and electronic devices 200 and 202 are illustrated.

The plurality of cameras 111 to 120 may transmit obtained videos to the server 300. At least one camera may provide a fixed-viewing-angle video of a stadium at a fixed location. For example, a camera 100 may photograph the whole stadium at a fixed location. The plurality of cameras 111 to 120 may be mounted on clothes of players participating in a game, and provide videos obtained from viewpoints of the players. For example, the camera 118 may be mounted on clothes 122 worn by a player. The plurality of cameras 111 to 120 may provide videos obtained at various locations in the stadium based on motions of the players. The videos obtained by the plurality of cameras 111 to 120 are transmitted to the server 300. The plurality of cameras 111 to 120 may include communication units and may transmit video data of the obtained videos to the server 300 through the communication units in a wired or wireless manner. The plurality of cameras 111 to 120 may have unique identifier (ID) information. The ID information may be, for example, Internet protocol (IP) addresses but is not limited thereto. The ID information may be used to identify a specific camera in a network. For example, the ID information of the camera 100 may include an IP address of '10.92.232.1', and the ID information of the camera 111 may include an IP address of '10.92.232.2'.

The plurality of cameras 111 to 120 may transmit the video data together with the ID information to the server 300. The plurality of cameras 111 to 120 may further include sensor units and may acquire motion information and direction information of the cameras through the sensor units. Depending on an embodiment, the plurality of cameras 111 to 120 may further include global positioning system (GPS) receivers and may acquire location information of the cameras through the GPS receivers.

The plurality of cameras 111 to 120 may transmit the video data together with the ID information, the motion information, the direction information, viewing angle information, and the location information of the cameras to the server 300.

The server 300 may receive the video data, the ID information, the motion information, the direction information, the viewing angle information, and the location information of the cameras from the plurality of cameras 111 to 120 through a communication unit. In the following description, compared to the 'video data', for convenience of explanation, the ID information, the motion information, the direction information, the viewing angle information, and the location information of the cameras will be referred to as 'additional data'. The additional data may be synchronized with the video data or may be included in the video data.

The server 300 may generate second videos by processing the video data and the additional data input from the plurality of cameras 111 to 120. The second videos may be videos obtained by stabilizing the videos obtained by the cameras. The server 300 may generate the stabilized second videos by using the motion information included in the additional data transmitted together with the video data. For example, the server 300 may receive the video data and the additional data from the camera 111, and generate the stabilized second video by using the motion information of the camera 111.

The server 300 may receive the video data and the additional data from the camera 112, and generate the stabilized second video by using the motion information of the camera 112.

As described above, the server 300 may receive the video data and the additional data transmitted from the plurality of cameras 111 to 120, and generate the second video corresponding to each camera.

The server 300 may generate UI information corresponding to the plurality of cameras 111 to 120, by using the ID information transmitted from the plurality of cameras 111 to 120. The UI information may include, for example, icon, graphic image, text, number, IP address, port, and domain information but is not limited thereto.

For example, the server 300 may generate an icon corresponding to the camera 100, by using the ID information transmitted from the camera 100. A graphic image required to generate the icon may be included in the ID information of the camera 100 or provided by the server 300. When the server 300 provides the graphic image, the server 300 may transmit a plurality of candidate images to the electronic device 200, and the electronic device 200 may display the plurality of candidate images on a screen, receive a user input, and determine an image corresponding to the camera 100. The icon may include text information, and the text information may be determined based on the ID information of the camera 100 or determined by receiving a user input through the electronic device 200.

The server 300 may generate a name of the camera 100 by using text included in the ID information of the camera 100, without generating an icon, and transmit the name to the electronic device 200.

Alternatively, the electronic device 200 may generate a camera name by receiving a user input. For example, the electronic device 200 may generate "main camera" by receiving, from a user, an input corresponding to the name of the camera 100.

In addition, the server 300 may generate an icon corresponding to the camera 116, by using the ID information transmitted from the camera 116. A graphic image required to generate the icon may be included in the ID information of the camera 116 or provided by the server 300. When the server 300 provides the graphic image, the server 300 may transmit a plurality of candidate images to the electronic device 200, and the electronic device 200 may display the plurality of candidate images on a screen, receive a user input, and determine an image corresponding to the camera 116. The icon may include text information, and the text information may be determined based on the ID information of the camera 116 or determined by receiving a user input through the electronic device 200.

The server 300 may generate a name of the camera 116 by using text included in the ID information of the camera 116, without generating an icon, and transmit the name to the electronic device 200.

The server 300 may transmit, to the electronic device 200 or 202, the UI information corresponding to the plurality of cameras 111 to 120, and the second video corresponding to a specific UI selected based on a user input received from the electronic device 200 or 202.

The electronic device 200 may be, for example, a television (TV). The electronic device 202 may be, for example, a smartphone. In the following description, for convenience of explanation, it is assumed that the electronic device 200 is a TV.

The electronic device 200 may receive the UI information from the server 300, and display UIs on a screen 201 based on the received UI information. When the user selects at least one of the UIs displayed on the screen 201, the electronic device 200 may transmit information about the selected UI to the server 300, and the server 300 may transmit the second video corresponding to the selected UI, to the electronic device 200. The electronic device 200 may display the received second video on the screen 201.

Figure 2:
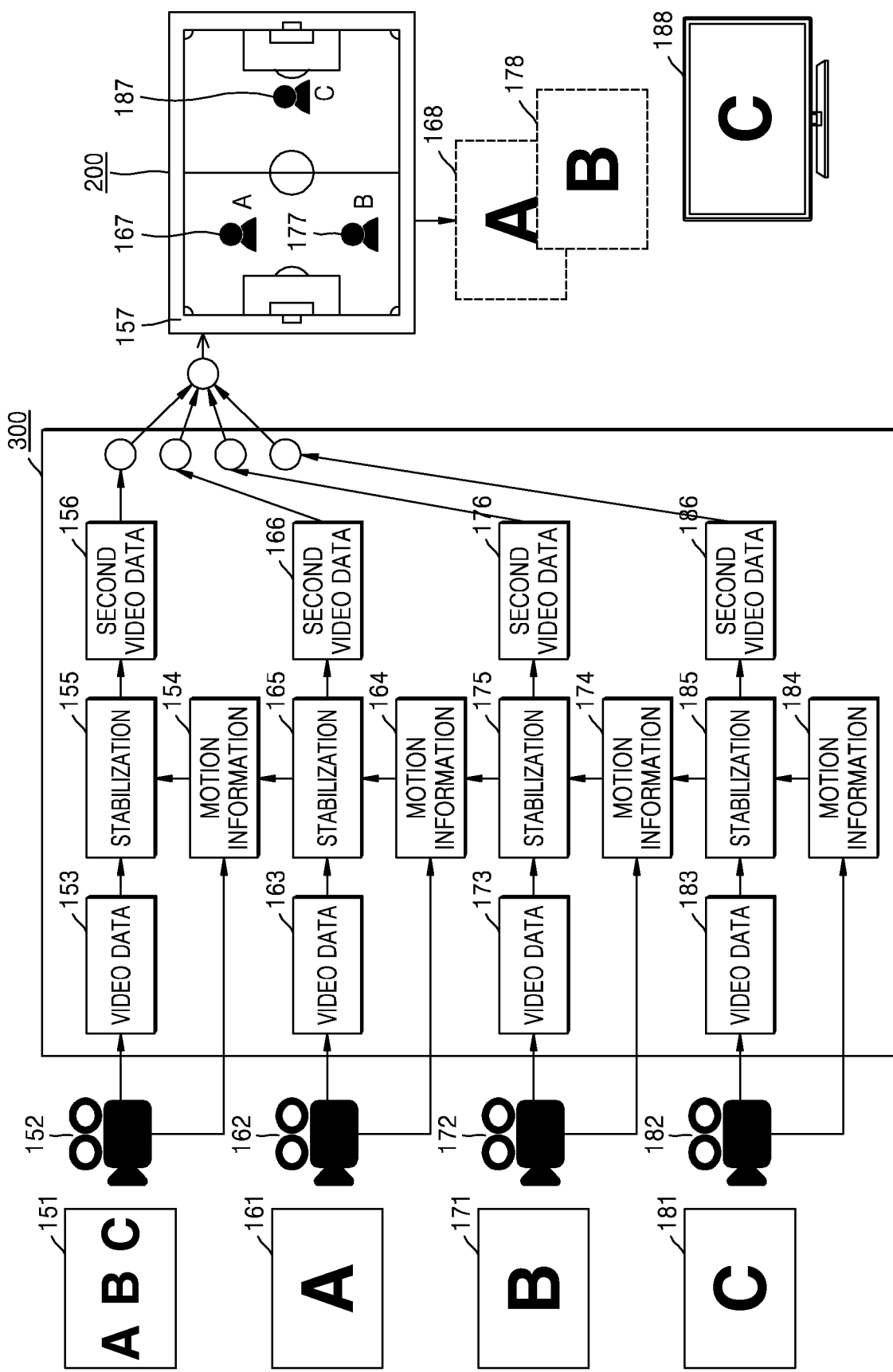
FIG. 2 illustrates an example of a procedure in which a system processes video data and additional data, according to an example embodiment of the present disclosure.

FIG. 2 illustrates an example of a procedure in which a system processes video data and additional data, according to an example embodiment of the present disclosure. For convenience of explanation, a sport game will be described below as an example but the present disclosure is not limited thereto.

Referring to FIG. 2, cameras 152, 162, 172, and 182, a server 300, and an electronic device 200 are illustrated.

The camera 152 obtains, for example, a video 151 of a whole stadium, and transmits video data 153 of the obtained video 151 to the server 300. The video 151 obtained by photographing the whole stadium may include object A, object B, and object C.

The server 300 may receive the video data 153 transmitted from the camera 152 and generate a second video 156 by stabilizing (155) the video data 153 based on motion information 154 of the camera 152, which is transmitted from the camera 152. The motion information 154 of the camera 152 may be transmitted separately from the video data 153 or transmitted in the form of additional data included in the video data 153. In addition to the motion information 154 of the camera 152, the additional data may include location information, direction information, and ID information of the camera 152. Depending on an embodiment, the camera 152 may photograph the whole stadium at a fixed location and, in this case, motion information thereof may not be generated. The motion information 154, the location information, and the direction information may be acquired by a sensor unit included in the camera 152. The motion information 154, the location information, and the direction information may be transmitted in synchronization with the video data 153. The server 300 may transmit the stabilized second video 156 to the electronic device 200 in response to a request of the electronic device 200.

Depending on an embodiment, the server 300 may transmit the second video 156 to the electronic device 200 without a request of the electronic device 200 to show the whole stadium.

The server 300 may generate UI information by using the ID information of the camera 152 and transmit the UI information to the electronic device 200. The UI information may include, for example, icon, graphic image, text, number, IP address, port, and domain information but is not limited thereto.

The camera 162 may be a camera mounted on, for example, clothes of player A participating in the game, and provide a point-of-view video 161 of the player A. The camera 162 transmits video data 163 of the obtained video 161 to the server 300. The server 300 may receive the video data 163 transmitted from the camera 162 and generate a second video 166 by stabilizing (165) the video data 163 based on motion information 164 of the camera 162, which is transmitted from the camera 162. The motion information 164 of the camera 162 may be transmitted separately from the video data 163 or transmitted in the form of additional data included in the video data 163. In addition to the motion information 164 of the camera 162, the additional data may include location information, direction information, and ID information of the camera 162. The motion information 164, the location information, and the direction information may be acquired by a sensor unit included in the camera 162. The motion information 164, the location information, and the direction information may be transmitted in synchronization with the video data 163. The server 300 may transmit the stabilized second video 166 to the electronic device 200 in response to a request of the electronic device 200.

The server 300 may generate UI information by using the ID information of the camera 162 and transmit the UI information to the electronic device 200. The UI information may include, for example, icon, graphic image, text, number, IP address, port, and domain information but is not limited thereto.

The camera 172 may be a camera mounted on, for example, clothes of player B participating in the game, and provide a point-of-view video 171 of the player B. The camera 172 transmits video data 173 of the obtained video 171 to the server 300. The server 300 may receive the video data 173 transmitted from the camera 172 and generate a second video 176 by stabilizing (175) the video data 173 based on motion information 174 of the camera 172, which is transmitted from the camera 172. The motion information 174 of the camera 172 may be transmitted separately from the video data 173 or transmitted in the form of additional data included in the video data 173. In addition to the motion information 174 of the camera 172, the additional data may include location information, direction information, and ID information of the camera 172. The motion information 174, the location information, and the direction information may be acquired by a sensor unit included in the camera 172. The motion information 174, the location information, and the direction information may be transmitted in synchronization with the video data 173. The server 300 may transmit the stabilized second video 176 to the electronic device 200 in response to a request of the electronic device 200.

The server 300 may generate UI information by using the ID information of the camera 172 and transmit the UI information to the electronic device 200. The UI information may include, for example, icon, graphic image, text, number, IP address, port, and domain information but is not limited thereto.

The camera 182 may be a camera mounted on, for example, clothes of player C participating in the game, and provide a point-of-view video 181 of the player C. The camera 182 transmits video data 183 of the obtained video 181 to the server 300. The server 300 may receive the video data 183 transmitted from the camera 182 and generate a second video 186 by stabilizing (185) the video data 183 based on motion information 184 of the camera 182, which is transmitted from the camera 182. The motion information 184 of the camera 182 may be transmitted separately from the video data 183 or transmitted in the form of additional data included in the video data 183. In addition to the motion information 184 of the camera 182, the additional data may include location information, direction information, and ID information of the camera 182. The motion information 184, the location information, and the direction information may be acquired by a sensor unit included in the camera 182. The motion information 184, the location information, and the direction information may be transmitted in synchronization with the video data 183. The server 300 may transmit the stabilized second video 186 to the electronic device 200 in response to a request of the electronic device 200.

The server 300 may generate UI information by using the ID information of the camera 182 and transmit the UI information to the electronic device 200. The UI information may include, for example, icon, graphic image, text, number, IP address, port, and domain information but is not limited thereto.

The electronic device 200 may display graphic images for interaction with the user, on a screen by using the UI information transmitted from the server 300. For example, the electronic device 200 may receive the UI information corresponding to the camera 152, the UI information corresponding to the camera 162, the UI information corresponding to the camera 172, and the UI information corresponding to the camera 182, from the server 300 and display UIs 157, 167, 177, and 187 on the screen. As described above, the UIs displayed on the screen may include icon, graphic image, text, number, IP address, port, and domain information.

Depending on an embodiment, the UI 157 may be replaced with a second video corresponding to the camera 152 and provided by the server 300. In this case, a video of the whole stadium may be displayed on the screen.

The electronic device 200 may receive a user input for selecting one of the UIs 157, 167, 177, and 187 displayed on the screen, receive a second video corresponding to the selected UI, from the server 300 based on the received user input, and display the received second video on the screen.

For example, when the user selects the UI 167, the electronic device 200 may transmit information indicating that the UI 167 is selected, to the server 300, and the server 300 may receive the information and transmit the second video 166 corresponding to the UI 167, to the electronic device 200.

The information transmitted from the electronic device 200 to the server 300 when the UI 167 is selected may include camera ID information corresponding to the selected UI 167, uniform resource locator (URL) information corresponding to content, information for requesting content corresponding to the UI 167, and content identification information, and may be encrypted before being transmitted to the server 300.

As such, a video 168 obtained by the camera 162 from a viewpoint of the player A may be displayed on the screen of the electronic device 200.

Depending on an embodiment, the server 300 may transmit a first frame or a thumbnail image of the second video 166 corresponding to the UI 167, together with URL information of the second video 166 to the electronic device 200, receive a reproduction command from the user, and then transmit the second video 166 to the electronic device 200.

As another example, when the user selects the UI 177, the electronic device 200 may transmit information indicating that the UI 177 is selected, to the server 300, and the server 300 may receive the information and transmit the second video 176 corresponding to the UI 177, to the electronic device 200. As such, a video 178 obtained by the camera 172 from a viewpoint of the player B may be displayed on the screen.

As another example, when the user selects the UI 187, the electronic device 200 may transmit information indicating that the UI 187 is selected, to the server 300, and the server 300 may receive the information and transmit the second video 186 corresponding to the UI 187, to the electronic device 200. As such, a video 188 obtained by the camera 182 from a viewpoint of the player C may be displayed on the screen.

Figure 3:
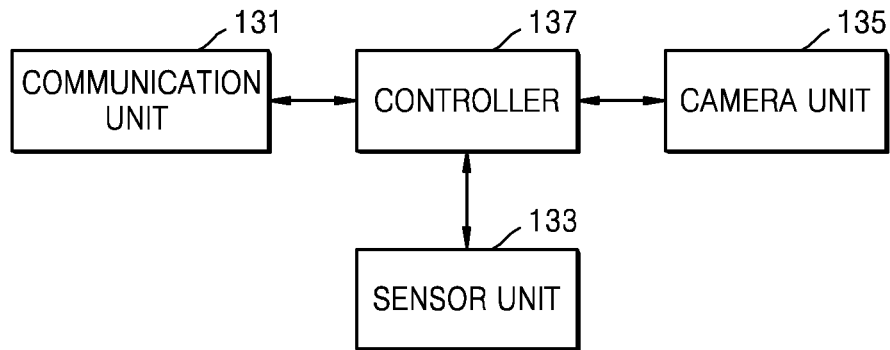
FIG. 3 is a block diagram of a camera according to an example embodiment of the present disclosure.

FIG. 3 is a block diagram of a camera according to an example embodiment of the present disclosure.

Referring to FIG. 3, the camera may include a communication unit 131, a sensor unit 133, a camera unit 135, and a controller 137.

The communication unit 131 may include a cellular module, a WiFi module, a bluetooth module, a near field communication (NFC) module, and a radio frequency (RF) module.

The cellular module may provide, for example, voice call services, video call services, text services, or Internet services through a communication network. According to an embodiment, the cellular module may identify and authenticate an electronic device in the communication network by using, for example, a subscriber identification module (SIM) card. According to an embodiment, the cellular module may perform at least some of functions providable by the controller 137. According to an embodiment, the cellular module may include a communication processor (CP).

Each of the WiFi module, the bluetooth module, and the NFC module may include, for example, a processor for processing data to be transmitted or received by the module. According to a certain embodiment, at least some (e.g., two or more) of the cellular module, the WiFi module, the bluetooth module, and the NFC module may be included in a single integrated chip (IC) or IC package.

The RF module may transmit and receive, for example, communication signals (e.g., RF signals). The RF module may include, for example, a transceiver, a power amplifier module (PAM), a frequency filter, a low noise amplifier (LNA), or an antenna. According to another embodiment, at least one of the cellular module, the WiFi module, the bluetooth module, a global navigation satellite system (GNSS) module, and the NFC module may transmit and receive RF signals through a different RF module.

The communication unit 131 transmits video data of a video obtained by the camera unit 135, to the server 300. The communication unit 131 may further include a GPS receiver, and transmit location information received from the GPS receiver, to the server 300.

The sensor unit 133 may include a plurality of sensors and output a signal based on motion, shake, and direction of the camera. Depending on an embodiment, the sensor unit 133 may output a signal including speed, acceleration, and time information of the camera.

The camera unit 135 may be configured as a CMOS sensor or a charge coupled device (CCD), and acquire video data by photographing an object.

The controller 137 may generate motion information and direction information of the camera by receiving the signal output from the sensor unit 133, and transmit the motion information and the direction information of the camera through the communication unit 131 to the server.

The controller 137 may include the motion information and the direction information of the camera in the video data in the form of additional data.

The controller 137 may synchronize the video data with the motion information and the direction information of the camera. For example, the controller 137 may generate the motion information and the direction information of the camera based on the signal output from the sensor unit 133, while generating the video data of one frame.

The controller 137 may transmit ID information of the camera to the server. The ID information of the camera may be included in the video data in the form of additional data, or transmitted to the server on a different channel.

Figure 4:
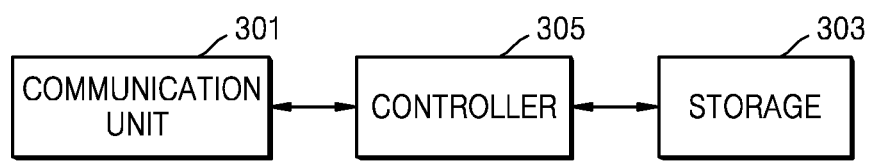
FIG. 4 is a block diagram of a server according to an example embodiment of the present disclosure.

FIG. 4 is a block diagram of a server according to an example embodiment of the present disclosure.

Referring to FIG. 4, the server may include a communication unit 301, a storage 303, and a controller 305.

The communication unit 301 may receive video data and additional data transmitted from a plurality of cameras. Examples of the additional data are described above in relation to FIG. 3.

The storage 303 may include, for example, at least one of volatile memory (e.g., dynamic random-access memory (DRAM), static RAM (SRAM), and synchronous dynamic RAM (SDRAM)) and non-volatile memory (e.g., one-time programmable read-only memory (OTPROM), programmable ROM (PROM), erasable programmable ROM (EPROM), electrically erasable programmable ROM (EEPROM), mask ROM, flash ROM, flash memory, a hard drive, and a solid state drive (SSD)).

The storage 303 may store second videos obtained by stabilizing the video data transmitted from the cameras.

The controller 305 may generate the second videos by performing stabilization by using the video data transmitted from the cameras and motion information included in the additional data.

The controller 305 may generate UI information corresponding to the cameras, by using IP information transmitted from the cameras. The controller 305 transmits the UI information to an electronic device.

Figure 5:
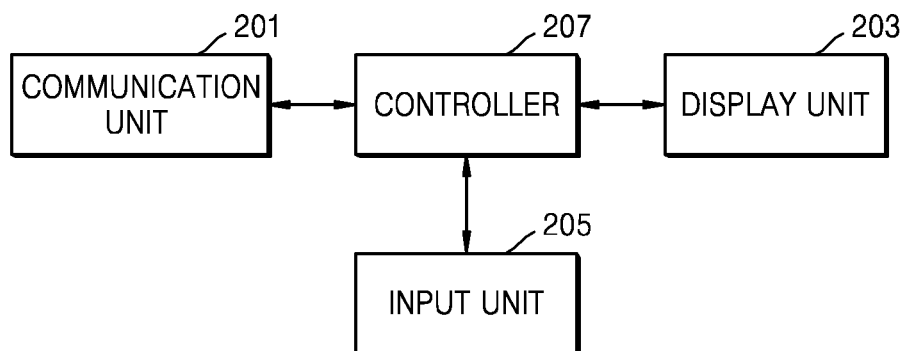
FIG. 5 is a block diagram of an electronic device according to an example embodiment of the present disclosure.

FIG. 5 is a block diagram of an electronic device according to an example embodiment of the present disclosure.

Referring to FIG. 5, the electronic device 100 may include a communication unit 201, a display unit 203, an input unit 205, and a controller 207.

The controller 207 may control a plurality of hardware or software elements connected to the controller 207 and perform various data processes and calculations by, for example, driving an operating system or application programs. The controller 207 may be configured as, for example, a system on chip (SoC). According to an embodiment, the controller 207 may further include a graphic processing unit (GPU) and/or an image signal processor. The controller 207 may load and process commands or data received from at least one of the other elements (e.g., the non-volatile memory), in the volatile memory, and store various types of data in the non-volatile memory.

The display unit 203 may include, for example, a liquid crystal display (LCD), a light-emitting diode (LED) display, an organic light-emitting diode (OLED) display, a microelectromechanical system (MEMS) display, or an electronic paper display. The display unit 203 may display, for example, various contents (e.g., text, images, videos, icons, and symbols) to a user. The display unit 203 may include a touchscreen and receive, for example, touch, gesture, proximity, or hovering inputs using an electronic pen or a body part of the user.

The input unit 205 may include, for example, a touch panel, a (digital) pen sensor, keys, or an ultrasonic input device. The touch panel may use at least one of capacitive, resistive, infrared, and ultrasonic schemes. The touch panel may further include a control circuit. The touch panel may further include a tactile layer to provide a tactile response to the user.

The (digital) pen sensor may be, for example, a part of the touch panel or include a separate recognition sheet. The keys may include, for example, physical buttons, optical keys, or a keypad. The ultrasonic input device may sense an ultrasonic wave input through a microphone from an input tool, and identify data corresponding to the sensed ultrasonic wave.

Figure 6:
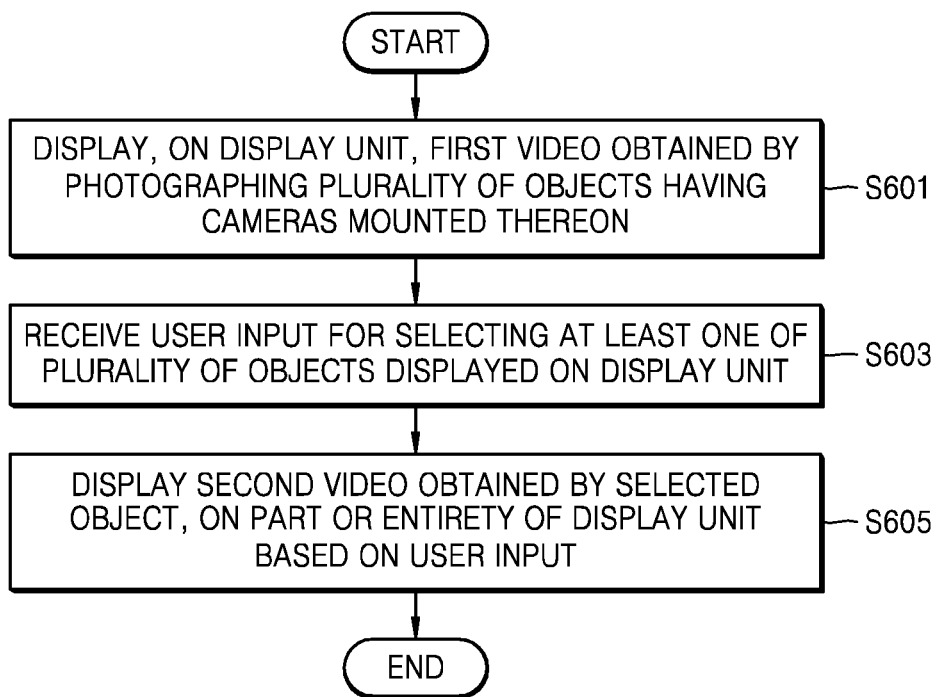
FIG. 6 is a flowchart of a procedure in which an electronic device displays a first video or a second video on a screen based on a user input, according to an example embodiment of the present disclosure.

FIG. 6 is a flowchart of a procedure in which an electronic device displays a first video or a second video on a screen based on a user input, according to an example embodiment of the present disclosure.

Figure 7:
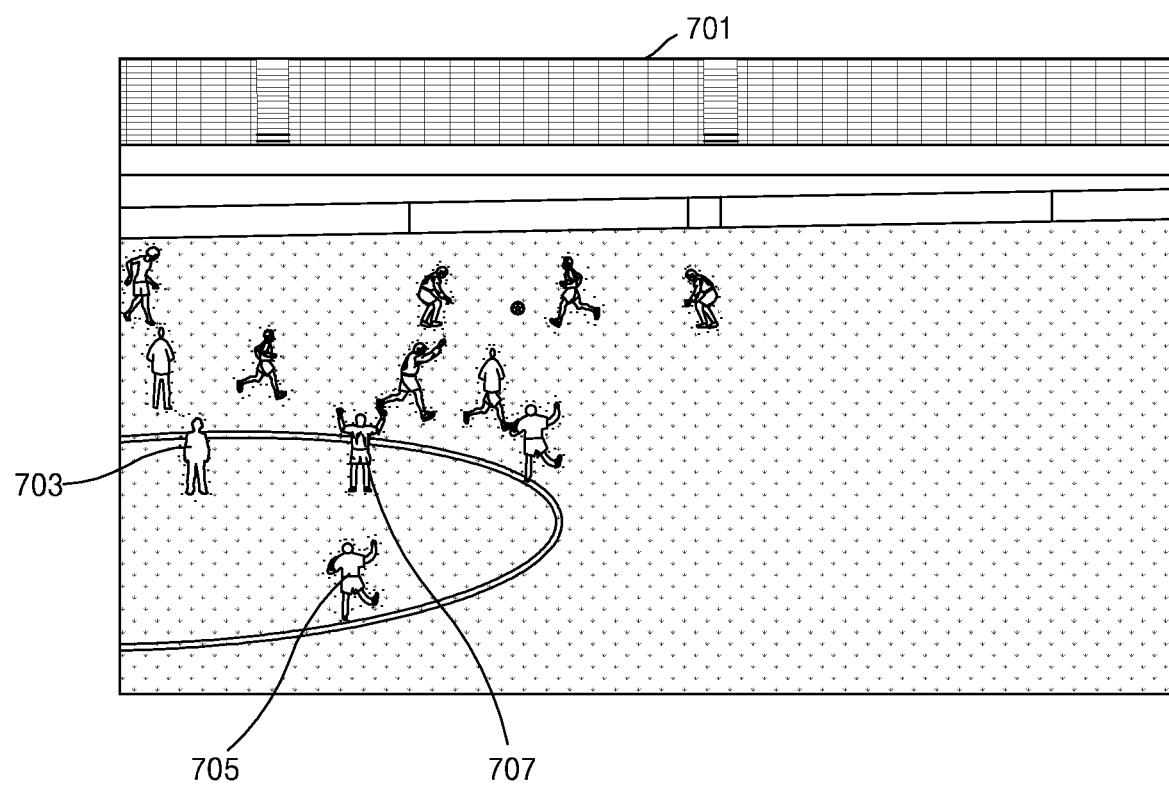
FIG. 7 illustrates an example in which a first video obtained by photographing a plurality of objects is displayed on a display unit of an electronic device, according to an example embodiment of the present disclosure.

FIG. 7 illustrates an example in which a first video obtained by photographing a plurality of objects is displayed on a display unit of an electronic device, according to an example embodiment of the present disclosure.

Figure 8:
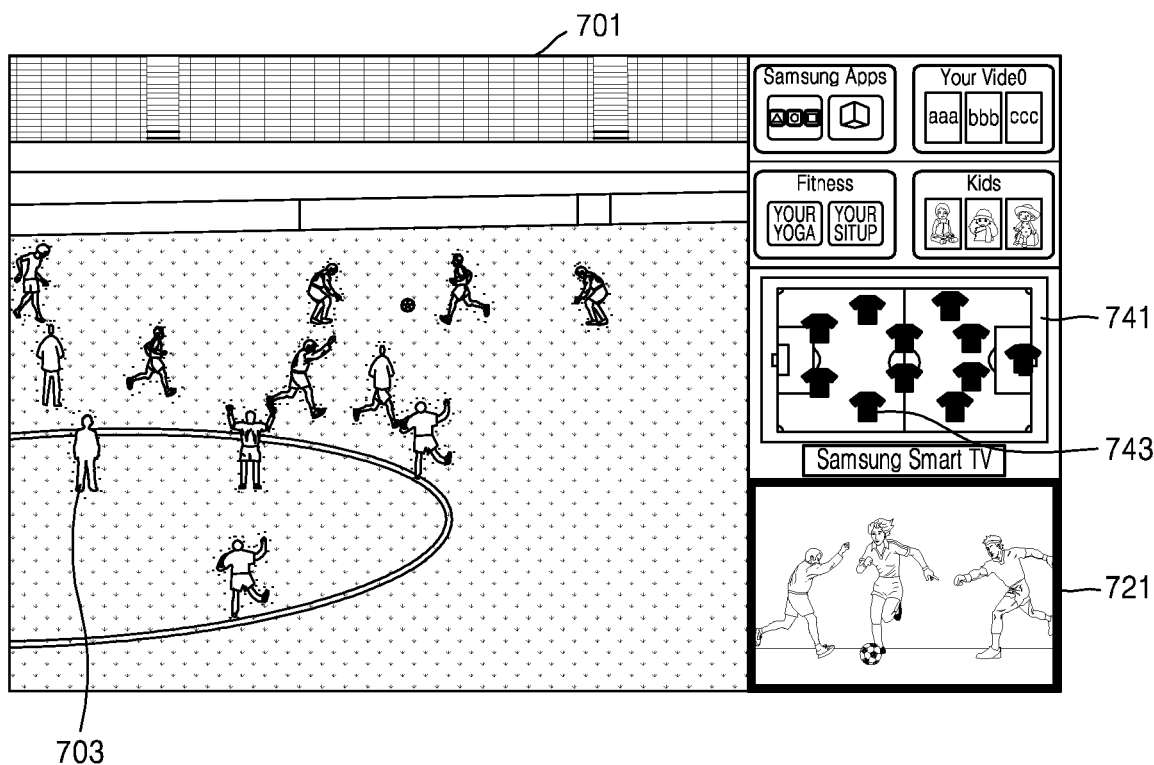
FIG. 8 illustrates an example in which a first video obtained by photographing a plurality of objects, a second video obtained by an object, and user interfaces (UIs) are displayed on a display unit of an electronic device, according to an example embodiment of the present disclosure.

FIG. 8 illustrates an example in which a first video obtained by photographing a plurality of objects, a second video obtained by an object, and UIs are displayed on a display unit of an electronic device, according to an example embodiment of the present disclosure.

A procedure in which an electronic device displays a first video or a second video will now be described with reference to FIGS. 6 to 8.

In operation S601, an electronic device displays, on a display unit, a first video obtained by photographing a plurality of objects having cameras mounted thereon.

Referring to FIG. 7, a first video 701 is displayed on a display unit of an electronic device. The first video 701 may be a video obtained by photographing a plurality of objects

703, 705, and 707. For example, the first video 701 may be a video obtained by photographing a whole stadium. The objects 703, 705, and 707 included in the first video 701 may be, for example, player participating in a game, or cameras mounted on clothes or body parts of the players. The first video 701 may be an airwave broadcast video. When the object 703 is selected from the first video 701 displayed on the electronic device, a point-of-view video (e.g., a second video) of the object 703 may be overlaid on the first video 701.

Referring to FIG. 8, a first video 701, a second video 721, and a UI 741 including a plurality of objects are displayed on a display unit of an electronic device. The first video 701 may be, for example, an airwave video and be received through a tuner or a communication network. The second video 721 and the UI 741 may be overlaid on the first video 701.

The UI 741 may be displayed on the display unit based on UI information transmitted from a server. The UI 741 may be a graphic image corresponding to a whole stadium. For example, the UI 741 may be a map image of a soccer stadium.

A UI 743 may be an icon corresponding to an object 703 included in the first video 701, or a camera mounted on the object 703. For example, UIs may include the graphic image 741 of the whole stadium and the icon 743 corresponding to a player participating in a game, which is overlaid on the graphic image 741. That is, the icon 743 corresponding to the player included in the first video 701 may be displayed on a screen.

In operation S603, the electronic device receives a user input for selecting at least one of the plurality of objects displayed on the display unit.

In FIG. 8, the player 703 included in the first video 701 may correspond to an object and the UIs 741 and 743 corresponding to the object may be overlaid on the first video 701.

In operation S605, the electronic device displays a second video obtained by the selected object, on a part or the entirety of the display unit based on the user input.

Referring to FIG. 8, the electronic device may receive a user input through the UIs 741 and 743 displayed on the display unit. For example, when a user selects one of the UIs 741 and 743 displayed on the display unit (e.g., the UI 743), the second video 721 corresponding to the selected UI 743 may be displayed on a part of the display unit. Depending on an embodiment, the second video 721 may be displayed on the entirety of the display unit. The second video 721 may be a video obtained by the object 703.

The UI 743 may include URL information of the second video 721. That is, the UI 743 may include URL information connectable to the video obtained by the object 703, and the electronic device may access a corresponding URL when the user selects the UI 743.

In addition, the UI 743 may include ID information of a camera mounted on the object 703. The electronic device may receive the ID information transmitted from the camera mounted on the object 703, through the server, and display a UI corresponding thereto, on the display unit. For example, the electronic device may display the ID information of the camera as text or display an icon corresponding thereto, on the display unit.

The second video 721 may be obtained by stabilizing video data transmitted from the camera mounted on the object 703, by using motion information output from a sensor unit of the camera. The sensor unit may output data based on motion of the camera, and the server may receive the data, generate the motion information of the camera, and generate the second video by stabilizing the video data by using the motion information. The server transmits the second video to the electronic device.

Depending on an embodiment, the camera may transmit location information thereof to the server. The server may determine a display location of a UI to be displayed on the electronic device, by using the location information. The electronic device may receive information about the display location of the UI from the server and display the UI on the display unit based on the received information. When the location information of the camera is changed, the location of the UI displayed on the display unit may also be changed.

The object 703 and the UI 743 corresponding thereto are described as examples above for convenience of explanation but the present disclosure is not limited thereto. The above description may also be applicable to all objects included in the first video, and UIs corresponding to the objects.

FIGS. 9 to 12 illustrate various examples in which a first video, a second video, and UIs are displayed using a plurality of electronic devices, according to an example embodiment of the present disclosure. For convenience of explanation, a first electronic device and a second electronic device will be described. The first electronic device may be, for example, a TV, and the second electronic device may be a smartphone.

Figure 9:
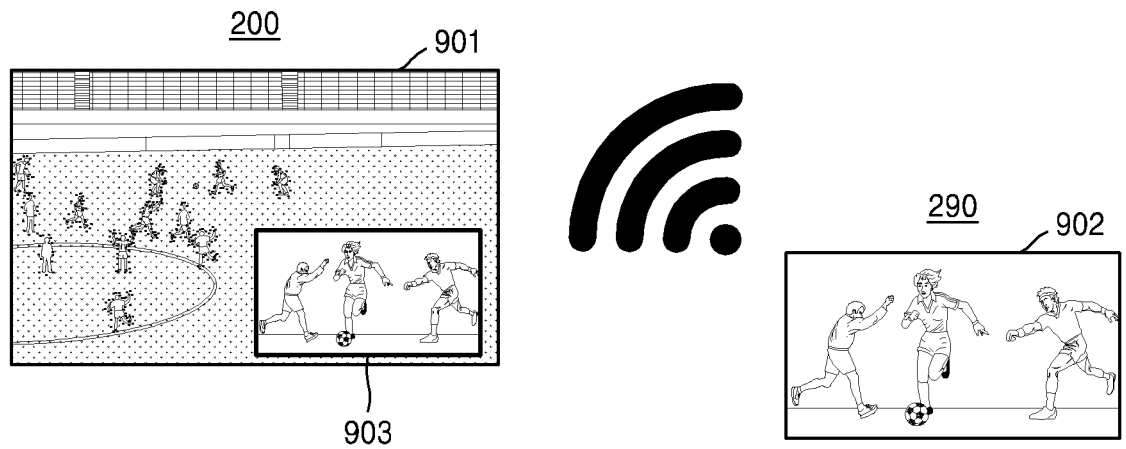
FIGS. 9 to 12 illustrate various examples in which a first video, a second video, and UIs are displayed using a plurality of electronic devices, according to an example embodiment of the present disclosure.

Referring to FIG. 9, a first electronic device 200 and a second electronic device 290 are illustrated. A first video 901 and a plurality of UIs (not shown) may be displayed on the first electronic device 200. When a user selects one of the plurality of UIs, a second video 902 corresponding to the selected UI may be displayed on the second electronic device 290. In this state, when the user mirrors the second video 902 to the first electronic device 200, the second video 902 may be displayed (903) on the first video 901 in a picture in picture (PIP) mode.

Figure 10:
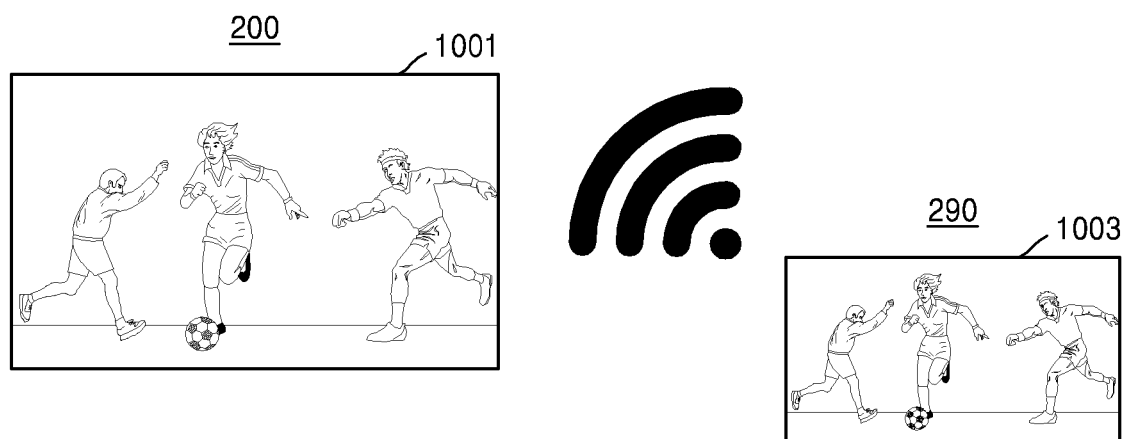

Referring to FIG. 10, a first electronic device 200 and a second electronic device 290 are illustrated. A first video (not shown) and a plurality of UIs (not shown) may be displayed on the first electronic device 200. When a user selects one of the plurality of UIs, a second video 1003 corresponding to the selected UI may be displayed on the second electronic device 290. In this state, when the user mirrors the second video 1003 to the first electronic device 200, the second video 1003 may be displayed (1001) on a whole screen of the first electronic device 200.

Figure 11:
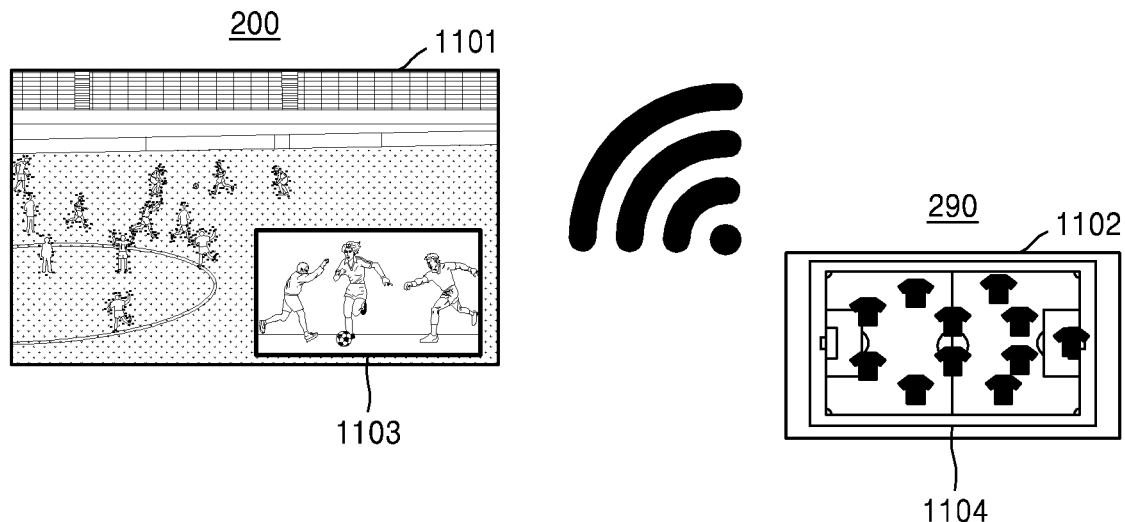

Referring to FIG. 11, a first electronic device 200 and a second electronic device 290 are illustrated. A first video 1101 may be displayed on the first electronic device 200. A plurality of UIs 1102 may be displayed on the second electronic device 290. The first video 1101 may be a video obtained by photographing a plurality of objects.

Depending on an embodiment, the first video 1101 may be an airwave broadcast video received through a tuner, or a broadcast video received through a communication network from a server.

When a user selects a UI 1104 from among the plurality of UIs 1102 on the second electronic device 290, the server may transmit a second video 1103 corresponding to the selected UI 1104, to the first electronic device 200, and the first electronic device 200 may display the second video 1103 on the first video 1101 in a PIP mode.

For example, the first electronic device 200 may receive the first video 1101 obtained by photographing the plurality of objects, and the second video 1103 corresponding to the selected UI 1104, from the server, and display the second video 1103 on the first video 1101 in a PIP mode.

Otherwise, the first electronic device 200 may receive the first video 1101 corresponding to a broadcast video, and the second video 1103 corresponding to the selected UI 1104, from the server, and display the second video 1103 on the first video 1101 in a PIP mode.

Alternatively, the first electronic device 200 may receive the first video 1101 (e.g., a broadcast video) from the tuner, receive the second video 1103 corresponding to the selected UI 1104, from the server, and display the second video 1103 on the first video 1101 in a PIP mode.

Figure 12:
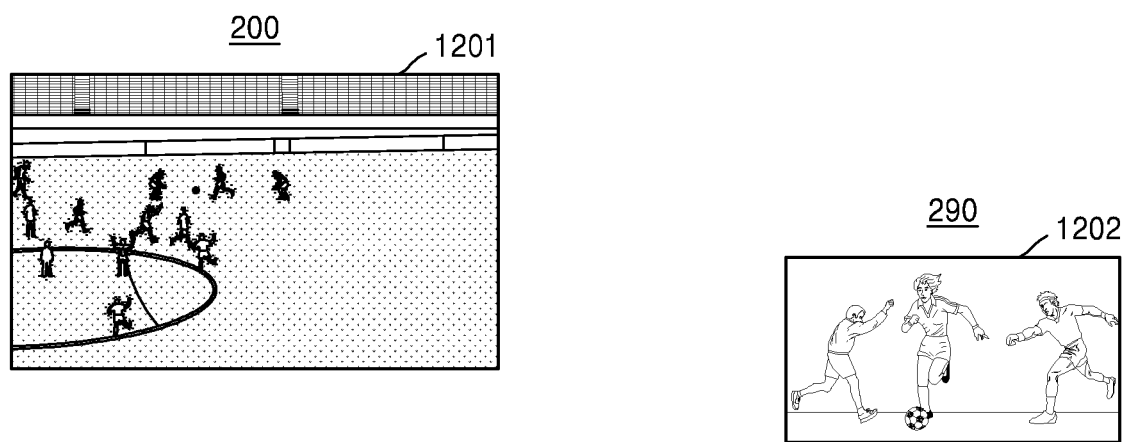

Referring to FIG. 12, a first electronic device 200 and a second electronic device 290 are illustrated. A first video 1201 and a plurality of UIs (not shown) may be displayed on the first electronic device 200. When a user selects one of the plurality of UIs, a second video 1202 corresponding to the selected UI may be displayed on the second electronic device 290.

Figure 13:
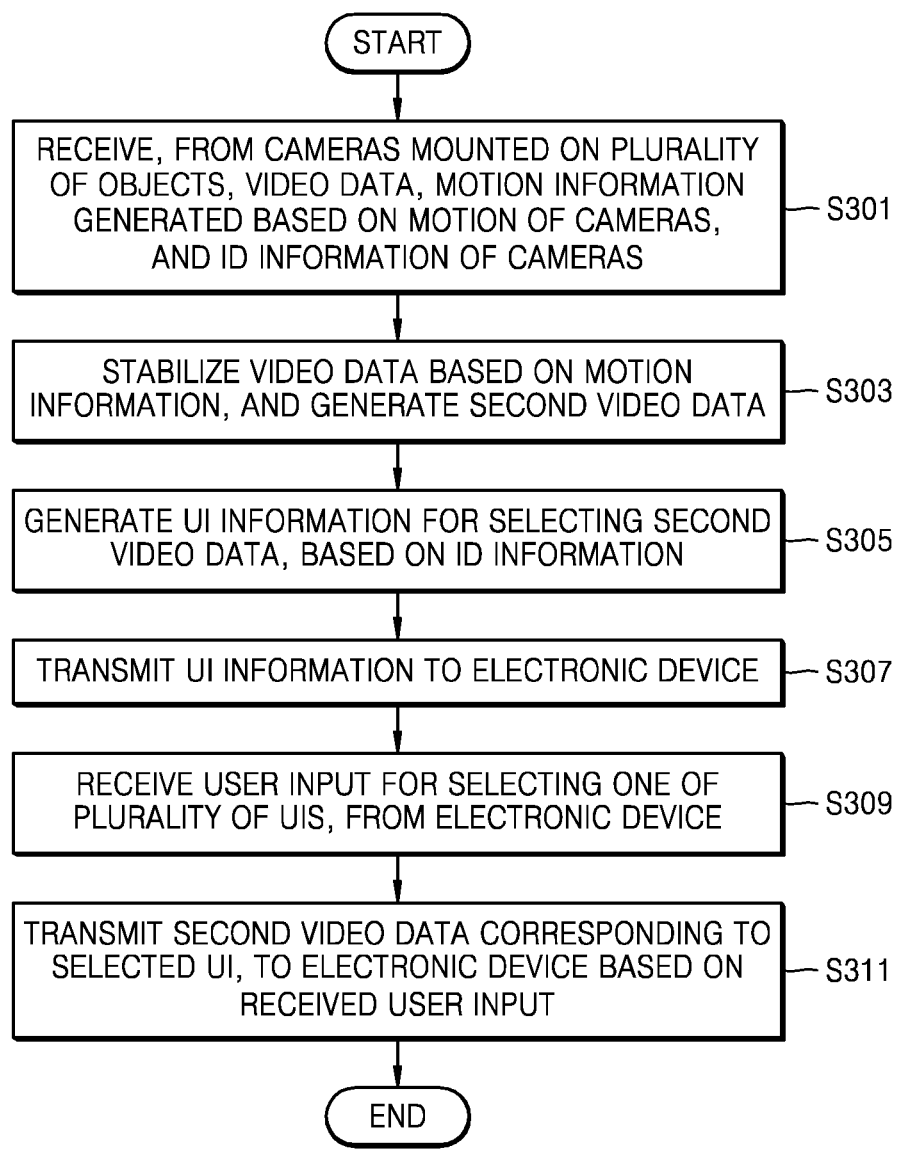
FIG. 13 is a flowchart of a procedure in which a server generates and transmits UI information to an electronic device, according to an example embodiment of the present disclosure.

FIG. 13 is a flowchart of a procedure in which a server generates and transmits UI information to an electronic device, according to an example embodiment of the present disclosure.

Figure 14:
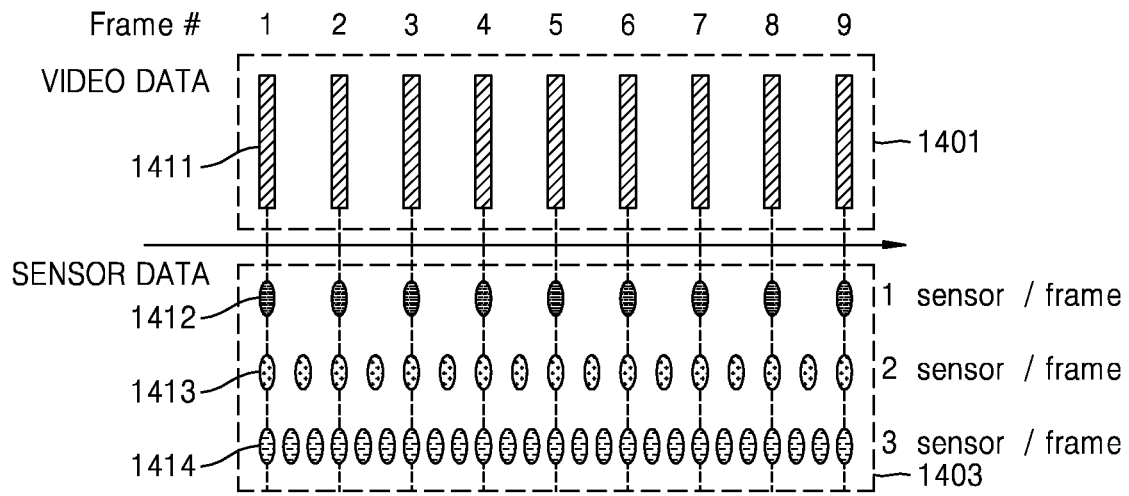
FIGS. 14 and 15 illustrate video data and sensor data received by a server. The sensor data may include motion information of a camera.
Figure 15:
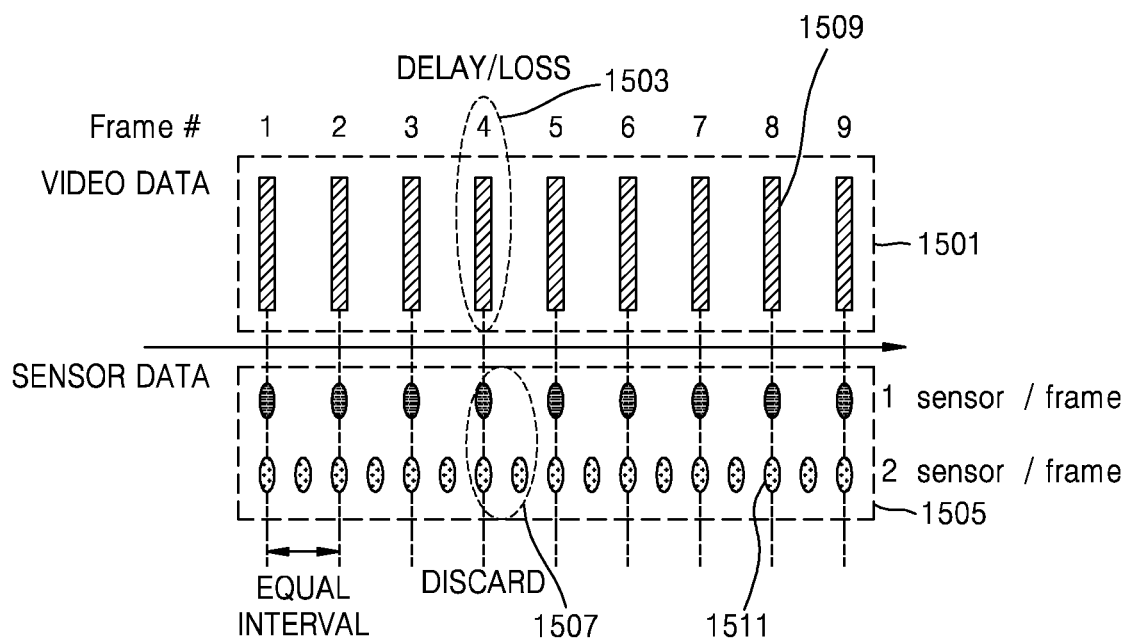

FIGS. 14 and 15 illustrate video data and sensor data received by a server. The sensor data may include motion information of a camera.

Referring to FIG. 13, in operation S301, the server receives, from cameras mounted on a plurality of objects, video data, motion information generated based on motion of the cameras, and ID information of the cameras. The motion information of the cameras may be received in synchronization with the video data.

Referring to FIG. 14, video data and sensor data transmitted from the camera are illustrated. The sensor data may be generated based on motion of the camera. That is, the sensor data may be motion information.

A controller (not shown) of the camera may transmit video data frames 1401 in synchronization with sensor data 1403. For example, the controller of the camera may transmit a video data frame 1411 together with a piece of sensor data 1412. Alternatively, the controller of the camera may transmit the video data frame 1411 together with a plurality of pieces of sensor data 1413 and 1414. That is, the controller of the camera may transmit sampled sensor data at a timing when a video data frame is transmitted. The controller of the camera may constantly maintain a sensor data transmission cycle as a divider of a video data frame transmission cycle.

Referring to FIG. 15, an example in which video data transmitted from the camera is delayed or lost is illustrated.

Sensor data has a very small data rate, e.g., several hundred bytes per second, and thus may be transmitted based on, for example, a transmission control protocol (TCP).

When any of video data frames 1501 is delayed or lost during transmission, the server may not process and may ignore sensor data corresponding thereto.

For example, when frame #4 1503 is delayed or lost while the video data frames 1501 are being transmitted, the server may not process and may ignore fourth sensor data 1507 corresponding thereto among sensor data 1505.

In operation S303, the server stabilizes the video data based on the motion information, and generates second videos.

The server may generate the motion information based on the sensor data transmitted from the cameras and generate the second videos by stabilizing the video data by using the motion information. Depending on an embodiment, the sensor data may be included in the video data in the form of additional data of the video data.

Referring to FIG. 15, for example, the server may stabilize a video data frame 1509 by using sensor data 1511.

In operation S305, the server generates UI information for selecting the second video, based on the ID information.

The ID information may be IP addresses for identifying the cameras in a network.

The ID information may include at least one of, for example, IP addresses, media access control (MAC) addresses, unique camera names, and serial numbers. The IP addresses may be information for identifying the cameras in a network. The MAC addresses may be unique identification information of the cameras. The unique camera names and the serial numbers may be information given by camera manufactures when the cameras are manufactured.

The server generates the UI information by using the ID information. For example, the UI information including the IP addresses of the cameras may be generated or the UI information including URLs for selecting the video data transmitted from the cameras may be generated. The UI information may be displayed on the electronic device in the form of text or graphic images. Depending on an embodiment, the UI information may include location information to be displayed on a display unit of the electronic device.

In operation S307, the server transmits the UI information to the electronic device.

The server transmits, to the electronic device, the UI information for generating UIs to be displayed on the display unit of the electronic device.

In operation S309, the server receives a user input for selecting one of a plurality of UIs, from the electronic device.

The electronic device may display the UIs on the display unit of the electronic device by using the UI information received from the server, and receive the user input through the UIs. For example, referring to FIG. 2, when a user selects the UI 187 from among the UIs 167, 177, and 187 displayed on the display unit of the electronic device 200, the server 300 may receive, from the electronic device 200, a user input indicating that the UI 187 is selected.

In operation S311, the server transmits the second video corresponding to the selected UI, to the electronic device based on the received user input.

When the user input indicating that the UI 187 is selected is received from the electronic device 200, the server 300 may transmit, to the electronic device 200, the second video 176 corresponding to the selected UI 187.

Figure 16:
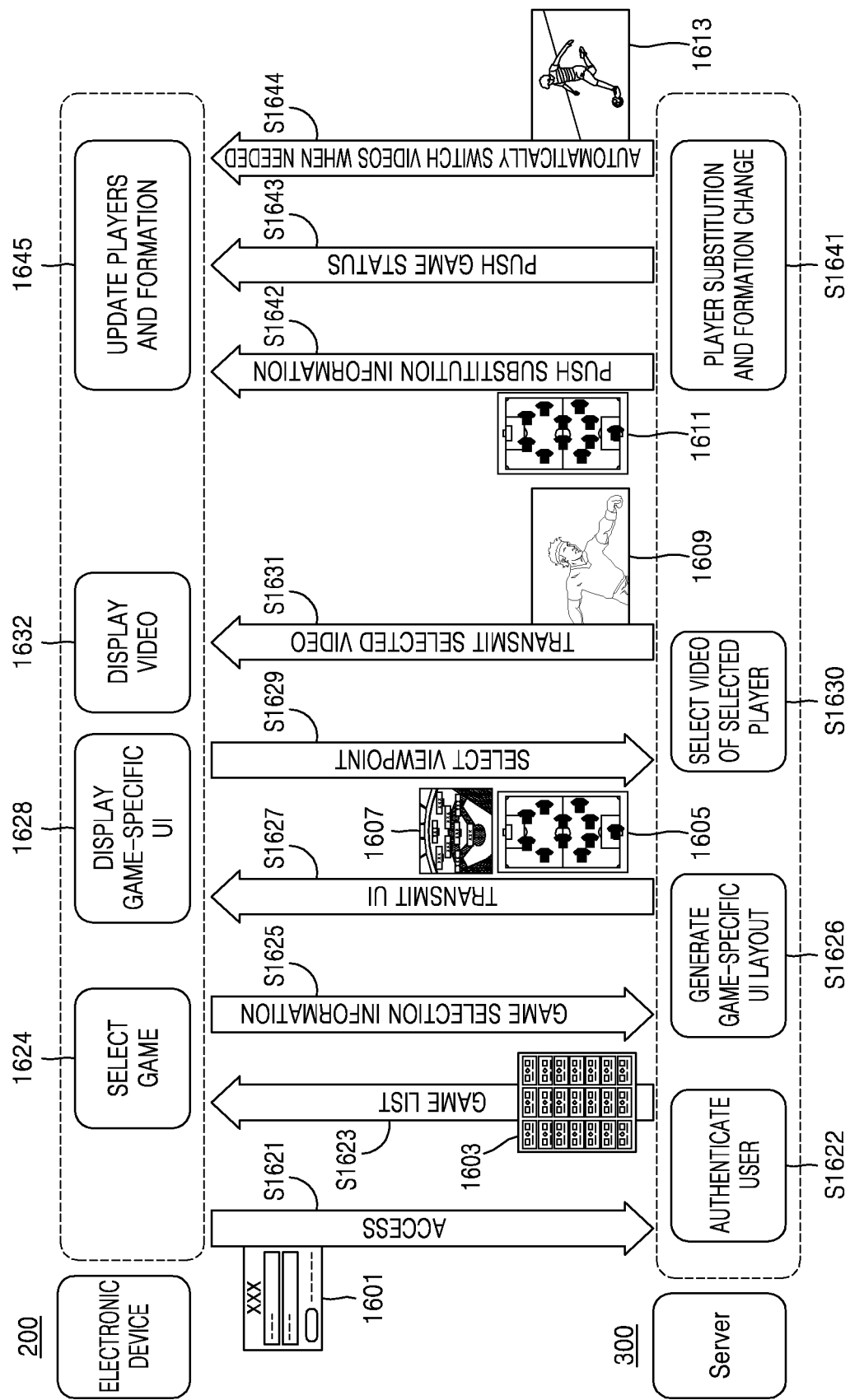
FIG. 16 illustrates a procedure in which an electronic device displays a point-of-view video, according to an embodiment of the present disclosure.

FIG. 16 illustrates a procedure in which an electronic device 200 displays a point-of-view video, according to an embodiment of the present disclosure. For convenience of explanation, a sport game will be described below as an example but the present disclosure is not limited thereto.

Referring to FIG. 16, the electronic device 200 may access a server 300 through a login page 1601 displayed on a display unit (S1621). The server 300 authenticates a user by receiving a user ID and a password input through the electronic device 200 (S1622), and transmits information about a game list 1603 to the electronic device 200 (S1623).

The electronic device 200 receives a user input for selecting a game on the game list displayed on a screen (S1624), and transmits game selection information to the server 300 (S1625).

The server 300 generates a game-specific UI layout by using the game selection information (S1626), and transmits a UI 1605 or 1607 corresponding to the selected game, to the electronic device 200 (S1627). That is, the server 300 may provide, to the electronic device 200, a UI related to a stadium map predetermined based on a sport game.

For example, when the user selects a soccer game, the server 300 may transmit, to the electronic device 200, the UI 1605 related to a soccer stadium. When the user selects a baseball game, the server 300 may transmit the UI 1607 related to a baseball stadium.

The electronic device 200 may display, on the screen, the game-specific UI received from the server 300 (S1628), and select a viewpoint of a specific player by selecting a specific player icon included in the UI.

The server 300 receives viewpoint selection information from the electronic device 200 (S1629), selects a video 1609 of the selected player (S1630), and transmits the selected video 1609 to the electronic device 200 (S1631). In addition, the server 300 may transmit a UI 1611 to the electronic device 200. The electronic device 200 may receive the video 1609 transmitted from the server 300 and display the video 1609 on the screen (S1632).

Upon determining that player substitution and formation change occur during the game (S1641), the server 300 may push player substitution information (S1642), push game status information (S1643), or automatically switch to a video 1613 of a substitute player (S1644).

The electronic device 200 may update player and formation information by using the information pushed from the server 300 (S1645).

Figure 17:
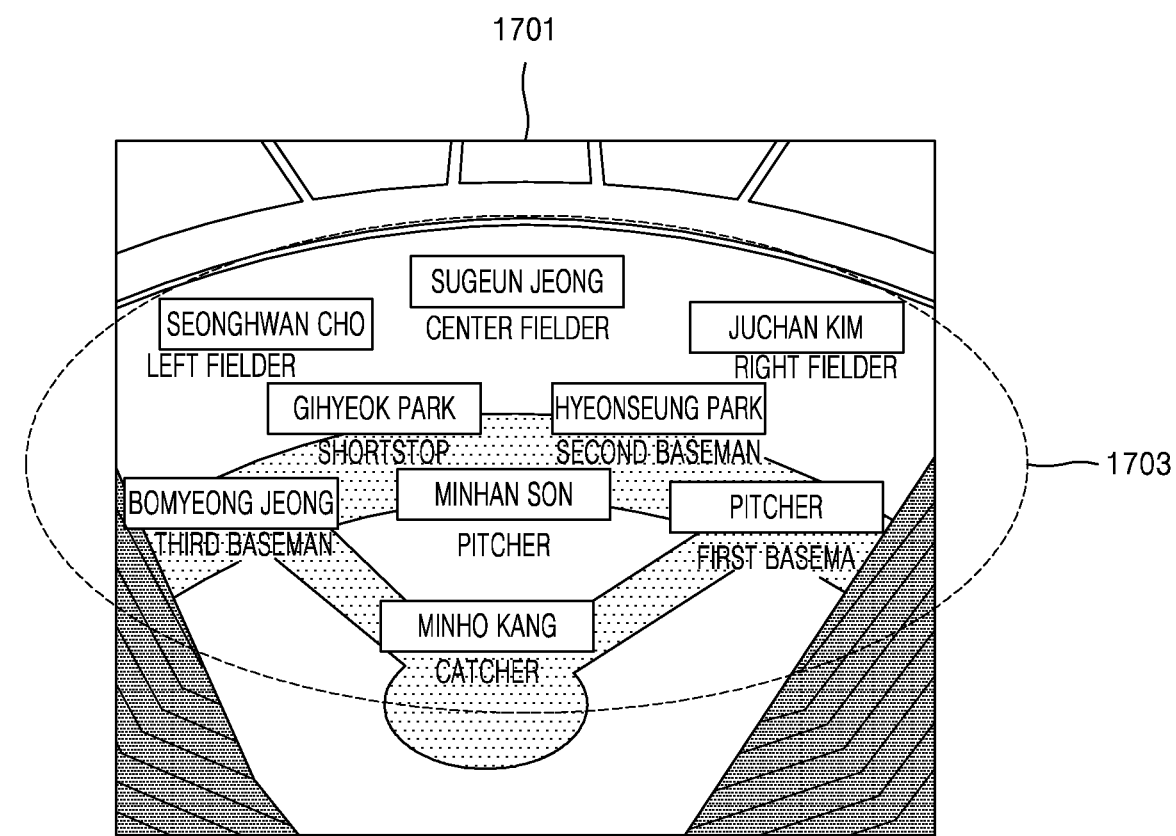
FIGS. 17 and 18 illustrate an example in which a server provides different UIs based on a type of an electronic device, according to an embodiment of the present disclosure.
Figure 18:
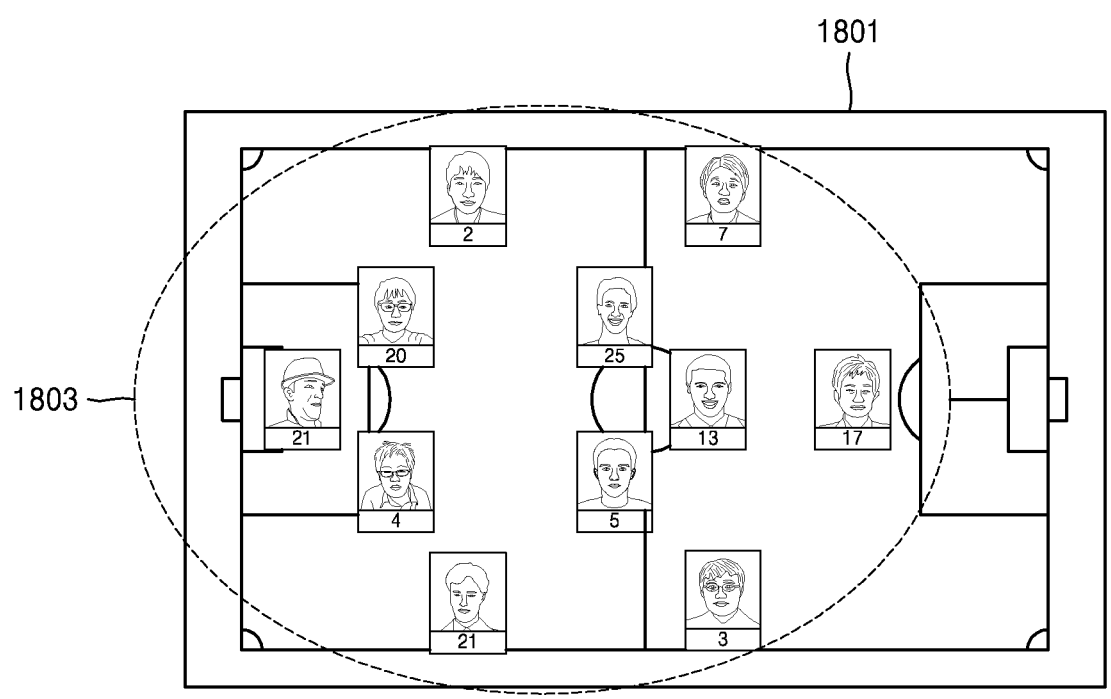

FIGS. 17 and 18 illustrate an example in which a server provides different UIs based on a type of an electronic device, according to an embodiment of the present disclosure.

Referring to FIG. 17, a baseball stadium UI 1701 and elements 1703 included in the baseball stadium UI 1701 are illustrated.

The baseball stadium UI 1701 may include a plurality of icons 1703 at locations of players participating in a baseball game. The plurality of icons 1703 may include names and positions of the players participating in the game.

The server may receive, from the electronic device, information about a game selected by a user, and transmit a baseball-specific UI 1701 to the electronic device when the game selected by the user is a baseball game.

Referring to FIG. 18, a soccer stadium UI 1801 and elements 1803 included in the soccer stadium UI 1801 are illustrated.

The soccer stadium UI 1801 may include a plurality of icons 1803 (=> 국문기재 : "1703") at locations of players participating in a soccer game. The plurality of icons 1803 may include photos and uniform numbers of the players participating in the game.

The server may receive, from the electronic device, information about a game selected by a user, and transmit a soccer-specific UI 1801 to the electronic device when the game selected by the user is a soccer game.

That is, the server may pre-store UIs for various games, in a storage, receive information about a game selected by the user, from the electronic device, and then determine and transmit a related UI based on the game information, to the electronic device.

Figure 19:
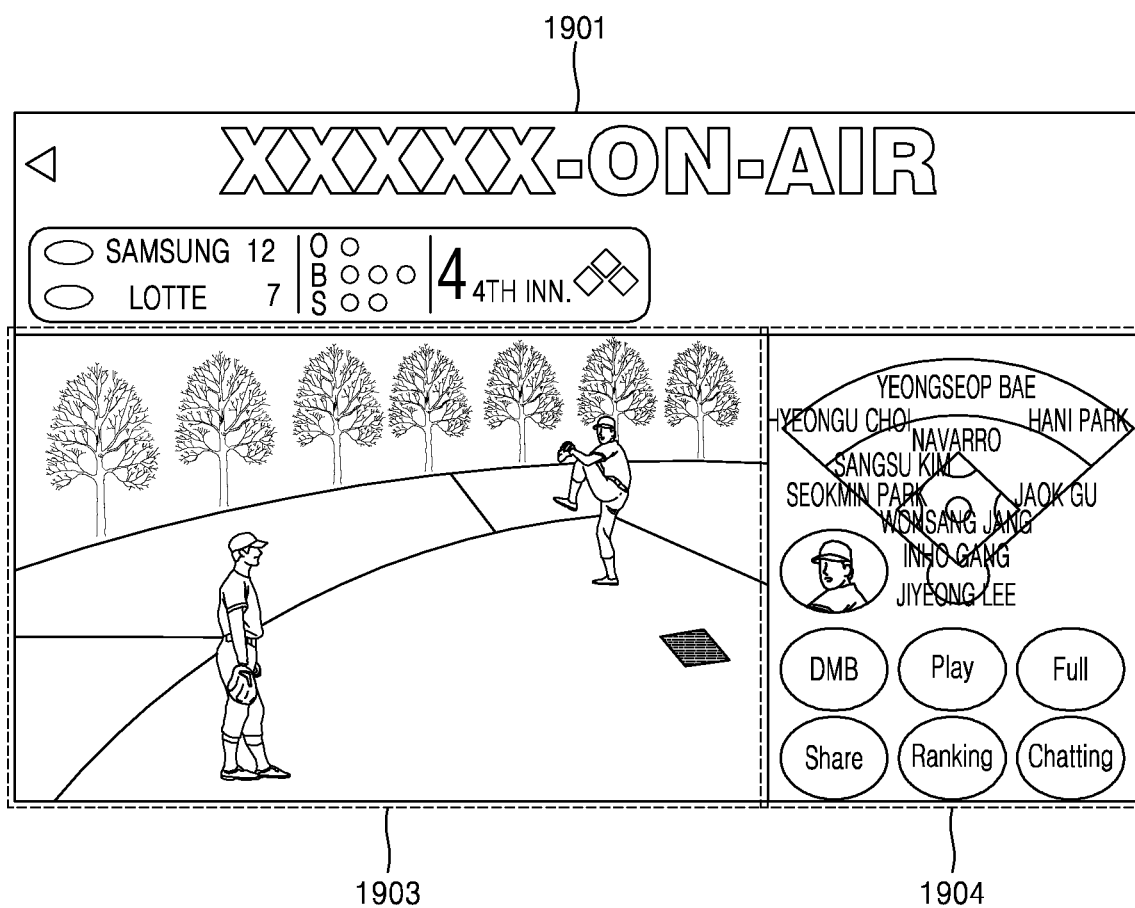
FIGS. 19 and 20 illustrate an example in which the server provides a different UI based on a form factor of the electronic device, according to an embodiment of the present disclosure.
Figure 20:
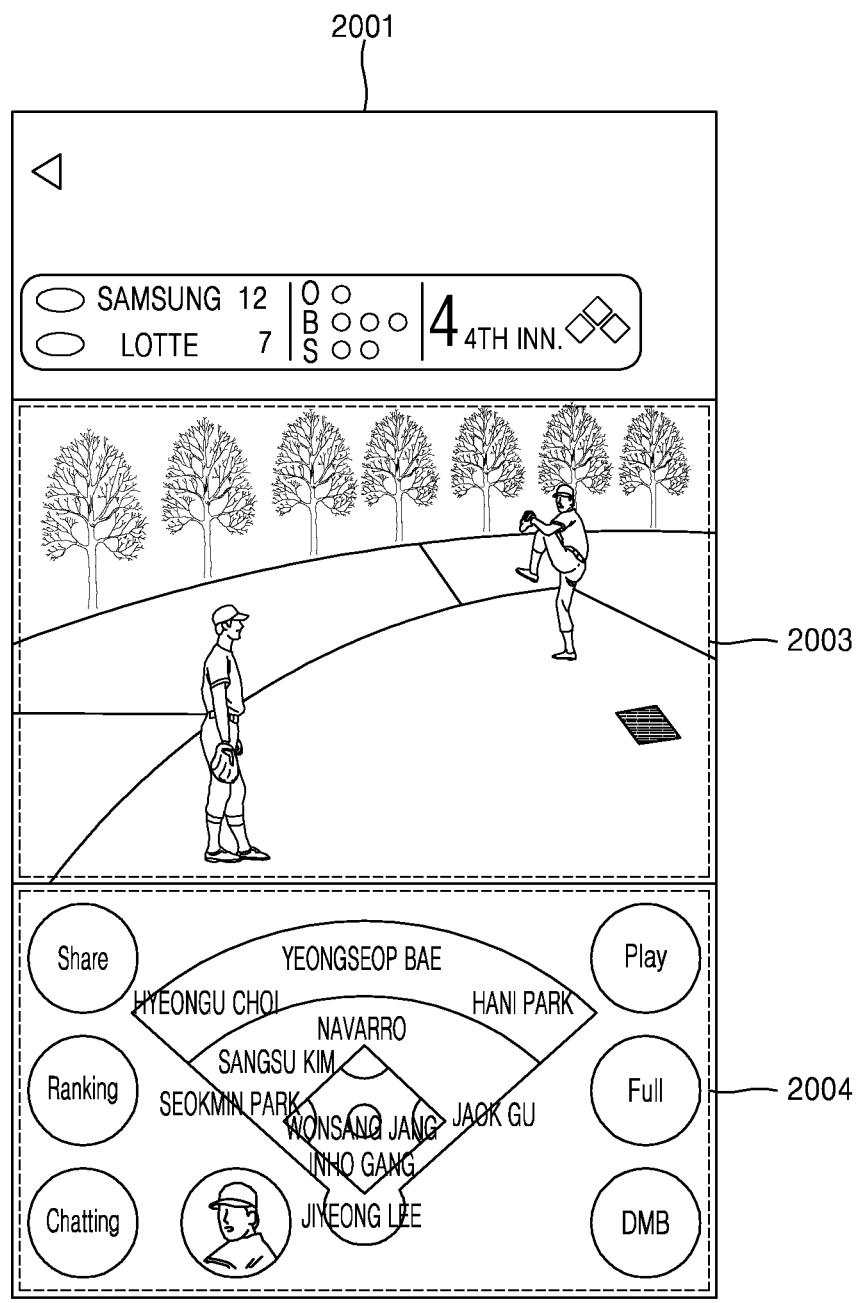

FIGS. 19 and 20 illustrate an example in which a server provides different UIs based on a form factor of an electronic device, according to an embodiment of the present disclosure.

For example, the server may provide a UI appropriate for a tablet, to the electronic device when the electronic device is the tablet, or provide a UI appropriate for a smartphone, to the electronic device when the electronic device is the smartphone.

The server may receive form factor information of the electronic device from the electronic device, and determine a UI based on the received form factor information.

Referring to FIG. 19, the server may receive the form factor information from the electronic device and determine that the electronic device is a tablet.

The server may transmit, to the electronic device, a UI 1904 appropriate for the tablet, and the electronic device may display the UI 1904 on a right or left part of a display unit.

For example, when the electronic device is a tablet, a video 1903 obtained from a viewpoint of an object selected by a user through the UI 1904 may be displayed on a left part of the display unit, and the UI 1904 may be displayed on a right part of the display unit, or vice versa.

Referring to FIG. 20, the server may receive the form factor information from the electronic device and determine that the electronic device is a smartphone.

The server may transmit, to the electronic device, a UI 2004 appropriate for the smartphone, and the electronic device may display the UI 2004 on a lower part of a display unit.

For example, when the electronic device is a smartphone, a video 2003 obtained from a viewpoint of an object selected by a user through the UI 2004 may be displayed on an upper part of the display unit, and the UI 2004 may be displayed on a lower part of the display unit, or vice versa.

Figure 21:
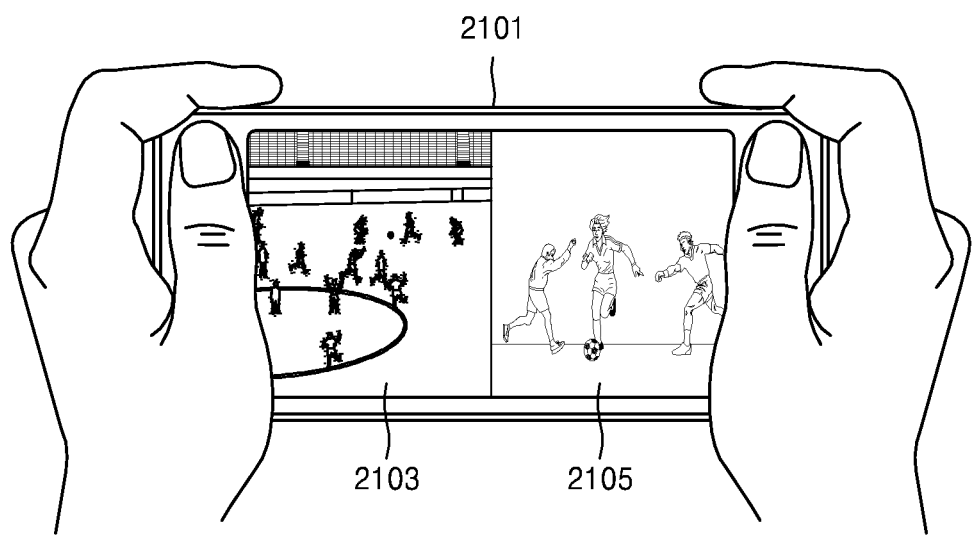
FIG. 21 illustrates another example in which an electronic device of the present disclosure displays a first video and a second video.

FIG. 21 illustrates another example in which an electronic device of the present disclosure displays a first video and a second video.

Referring to FIG. 21, a screen of the electronic device is split into left and right parts, and a first video 2103 is displayed on the left part of the screen whereas a second video 2105 is displayed on the right part of the screen.

The electronic device may be, for example, a smartphone. The first video 2103 may be a video obtained by photographing a plurality of objects, and the second video 2105 may be a point-of-view video of one of the plurality of objects.

When a request to reproduce a point-of-view video obtained by a specific object selected by a user is received from the user while the first video 2103 obtained by photographing the plurality of objects is being displayed on the screen, the electronic device may split the screen into the left and right parts, display the first video 2103 on one of the left and right parts, and display the point-of-view video of the object selected by the user, i.e., the second video 2105, on the other.

Figure 22:
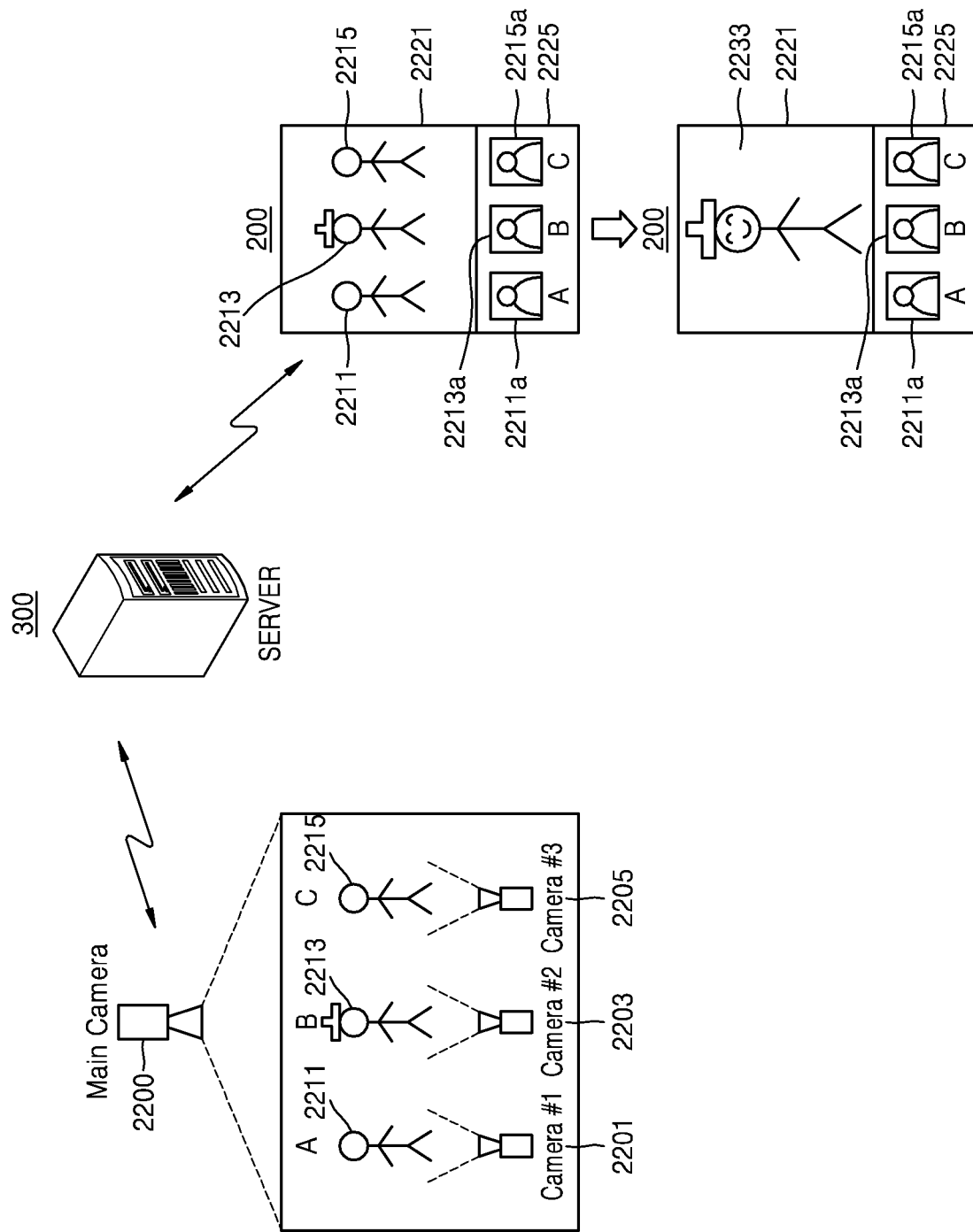
FIG. 22 illustrates another embodiment of the present disclosure.

FIG. 22 illustrates another embodiment of the present disclosure.

Referring to FIG. 22, a camera 2200 for photographing a plurality of objects, e.g., object A 2211, object B 2213, and object C 2215, a camera 2201 for mainly photographing the object A 2211, a camera 2203 for mainly photographing the object B 2213, a camera 2205 for mainly photographing the object C 2215, a server 300, and an electronic device 200 are illustrated.

The camera 2200 may photograph the object A 2211, the object B 2213, the object C 2215, and a background all together at a wide angle. The camera 2200 may be mounted at a fixed location or may be movable. The camera 2200 may transmit a obtained video to the server 300.

The object A 2211, the object B 2213, and the object C 2215 may be, for example, singers appearing in a performance.

The camera 2201 may mainly photograph the object A 2211 by automatically tracking the object A 2211, and may move as the object A 2211 moves. Otherwise, a person holding the camera 2201 may track the object A 2211. The camera 2201 may transmit, to the server 300, a video obtained by photographing the object A 2211.

The camera 2203 may mainly photograph the object B 2213 by automatically tracking the object B 2213, and may move as the object B 2213 moves. Otherwise, a person holding the camera 2203 may track the object B 2213. The camera 2203 may transmit, to the server 300, a video obtained by photographing the object B 2213.

The camera 2205 may mainly photograph the object C 2215 by automatically tracking the object C 2215, and may move as the object C 2215 moves. Otherwise, a person holding the camera 2205 may track the object C 2215. The camera 2205 may transmit, to the server 300, a video obtained by photographing the object C 2215.

The server 300 may stabilize the videos received from the cameras 2200, 2201, 2203, and 2205, and then transmit the stabilized videos to the electronic device 200.

For convenience of explanation, the video obtained by the camera 2200 is called a first video. The first video may include a plurality of objects and may be transmitted through the server 300 to the electronic device 200 or transmitted through an airwave broadcast network to the electronic device 200.

The cameras 2200, 2201, 2203, and 2205 may transmit ID information thereof to the server 300.

The server 300 may generate a UI by using the ID information received from the cameras 2200, 2201, 2203, and 2205, and transmit the generated UI to the electronic device 200. A procedure in which the server 300 generates the UI is described above in relation to FIG. 16, and thus a detailed description thereof will not be provided herein.

The electronic device 200 may display, on a screen, the first video and the UI received from the server. For example, the electronic device 200 may display the first video including the object A 2211, the object B 2213, and the object C 2215, on an upper part of the screen, and display a UI 2225 on a lower part of the screen. The UI 2225 may include an icon 2211a corresponding to the object A 2211, an icon 2213a corresponding to the object B 2213, and an icon 2215a corresponding to the object C 2215.

The icon 2211a may include text information generated based on the ID information transmitted from the camera 2201 (e.g., the name of a person) and a graphic image (e.g., a thumbnail image of the object A 2211). Alternatively, the icon 2211a may include an image generated by the server 300.

The icon 2213a may include text information generated based on the ID information transmitted from the camera 2203 (e.g., the name of a person) and a graphic image (e.g., a thumbnail image of the object B 2213). Alternatively, the icon 2213a may include an image generated by the server 300.

The icon 2215a may include text information generated based on the ID information transmitted from the camera 2205 (e.g., the name of a person) and a graphic image (e.g., a thumbnail image of the object C 2215). Alternatively, the icon 2215a may include an image generated by the server 300.

While the first video 2223 and the UI 2225 are being displayed on a screen 2221 of the electronic device 200, when a user selects one of a plurality of icons included in the UI 2225, a video corresponding to the selected icon may be displayed on the screen 2221. For example, when the user selects the icon 2213a, a second video 2233 obtained by photographing the object B 2213 may be displayed on an upper part of the screen 2221. The UI 2225 may be displayed on a lower part of the screen 2221.

Figure 23:
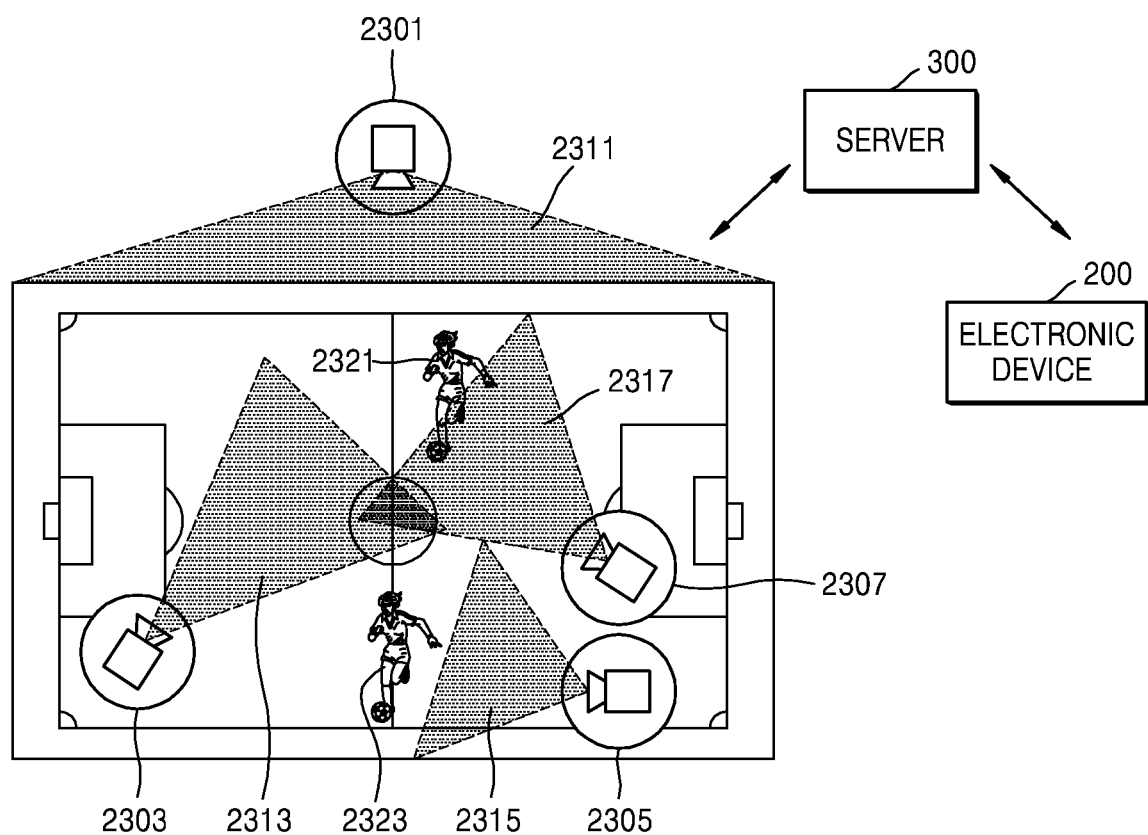
FIG. 23 illustrates an example in which an electronic device of the present disclosure obtains a third-person video of a specific player participating in a game.

FIG. 23 illustrates an example in which an electronic device of the present disclosure obtains a third-person video of a specific player participating in a game. For convenience of explanation, a soccer game will be described below as an example but the same principle may also be applicable to other sport games and performances.

Referring to FIG. 23, cameras 2301, 2303, 2305, and 2307, player A 2321, player B 2323, a server 300, and an electronic device 200 are illustrated.

The camera 2301 may photograph a whole stadium and have a viewing angle covering the whole stadium. The camera 2301 may be, for example, fixed at a specific location, and provide a video obtained by photographing the whole stadium, to the server 300. The video provided by the camera 2301 may include the cameras 2303, 2305, and 2307, the player A 2321, and the player B 2323.

The camera 2301 may include a GPS receiver and a sensor module (e.g., a geomagnetic sensor, a gyro sensor, and an acceleration sensor). The camera 2301 may acquire location information thereof through the GPS receiver. The camera 2301 may acquire the location information thereof based on triangulation using the difference in intensity between received radio waves (e.g., WiFi signals). Triangulation using the difference in intensity between radio waves may be used in an indoor environment where GPS signals are not receivable. The camera 2301 may acquire shooting direction information of the camera 2301 through the sensor module. In addition, the camera 2301 may have available viewing angle information. The camera 2301 may transmit the location information, the shooting direction information, and the viewing angle information of the camera 2301 together with a camera ID to the server 300, and the server 300 may receive the location information, the shooting direction information, and the viewing angle information of the camera 2301 and acquire current shooting range information 2311 of the camera 2301.

The camera 2303 may include a GPS receiver and a sensor module (e.g., a geomagnetic sensor, a gyro sensor, and an acceleration sensor). The camera 2303 may acquire location information thereof through the GPS receiver. The camera 2303 may acquire the location information thereof based on triangulation using the difference in intensity between received radio waves (e.g., WiFi signals). Triangulation using the difference in intensity between radio waves may be used in an indoor environment where GPS signals are not receivable. The camera 2303 may acquire shooting direction information of the camera 2303 through the sensor module. In addition, the camera 2303 may have available viewing angle information. The camera 2303 may transmit the location information, the shooting direction information, and the viewing angle information of the camera 2303 together with a camera ID to the server 300, and the server 300 may receive the location information, the shooting direction information, and the viewing angle information of the camera 2303 and acquire current shooting range information 2313 of the camera 2303.

The camera 2305 may include a GPS receiver and a sensor module (e.g., a geomagnetic sensor, a gyro sensor, and an acceleration sensor). The camera 2305 may acquire location information thereof through the GPS receiver. The camera 2305 may acquire the location information thereof based on triangulation using the difference in intensity between received radio waves (e.g., WiFi signals). Triangulation using the difference in intensity between radio waves may be used in an indoor environment where GPS signals are not receivable. The camera 2305 may acquire shooting direction information of the camera 2305 through the sensor module. In addition, the camera 2305 may have available viewing angle information. The camera 2305 may transmit the location information, the shooting direction information, and the viewing angle information of the camera 2305 together with a camera ID to the server 300, and the server 300 may receive the location information, the shooting direction information, and the viewing angle information of the camera 2305 and acquire current shooting range information 2315 of the camera 2305.

The camera 2307 may include a GPS receiver and a sensor module (e.g., a geomagnetic sensor, a gyro sensor, and an acceleration sensor). The camera 2307 may acquire location information thereof through the GPS receiver. The camera 2307 may acquire the location information thereof based on triangulation using the difference in intensity between received radio waves (e.g., WiFi signals). Triangulation using the difference in intensity between radio waves may be used in an indoor environment where GPS signals are not receivable. The camera 2307 may acquire shooting direction information of the camera 2307 through the sensor module. In addition, the camera 2307 may have available viewing angle information. The camera 2307 may transmit the location information, the shooting direction information, and the viewing angle information of the camera 2307 together with a camera ID to the server 300, and the server 300 may receive the location information, the shooting direction information, and the viewing angle information of the camera 2307 and acquire current shooting range information 2317 of the camera 2307.

The server 300 may receive the location information, the shooting direction information, and the viewing angle information of the cameras 2301, 2303, 2305, and 2307 from the cameras 2301, 2303, 2305, and 2307 and generate a camera map. The camera map may be an image of the whole stadium, on which camera locations are indicated, and be provided to the electronic device 200 in the form of UI information.

The player A 2321 and the player B 2323 may have GPS receivers and sensor modules mounted thereon. For example, the GPS receivers and the sensor modules may be attached to clothes of the player A 2321 and the player B 2323. Alternatively, the player A 2321 and the player B 2323 may wear the GPS receivers and the sensor modules in the form of smart watches. The player A 2321 and the player B 2323 may transmit location information thereof to the server 300 through the GPS receivers and the sensor modules.

The server 300 may generate a player map based on the location information provided by the player A 2321 and the player B 2323. The player map may be an image of the whole stadium, on which locations of the player A 2321 and the player B 2323 are indicated, and be provided to the electronic device 200 in the form of UI information.

The camera map and the player map may be displayed on a screen of the electronic device 200, a user may select a video obtained by photographing a desired player, based on the player map displayed on the screen, and the server 300 may select and provide a third-person video obtained by photographing a specific player, to the electronic device 200 based on the location information, the shooting direction information, and the viewing angle information of the cameras 2301, 2303, 2305, and 2307, which are received from the cameras 2301, 2303, 2305, and 2307, and the location information of the player A 2321 and the player B 2323, which is received from the player A 2321 and the player B 2323.

That is, the electronic device 200 may receive a signal for selecting a specific player from the user, and transmit player selection information to the server 300, and the server 300 may provide a third-person video obtained by photographing the selected player, to the electronic device 200 based on the player selection information received from the electronic device 200.

For example, when the user selects the player A 2321 through the electronic device 200, selection information of the player A 2321 may be transmitted to the server 300, and the server 300 may acquire the location information of the player A 2321 based on the selection information of the player A 2321, and determine that the camera 2307 is the closest to the player A 2321, by using the location information of the player A 2321. In addition, the server 300 may determine that the player A 2321 is in a shooting range of the camera 2307, by using the shooting direction information and the viewing angle information of the camera 2307. The server 300 may transmit a video obtained by the camera 2307, to the electronic device 200.

As another example, when the user selects the player B 2323 through the electronic device 200, selection information of the player B 2323 may be transmitted to the server 300, and the server 300 may acquire the location information of the player B 2323 based on the selection information of the player B 2323, and determine that the camera 2307 and the camera 2305 are the closest to the player B 2323, by using the location information of the player B 2323. The server 300 may determine that the player B 2323 is out of a shooting range of the camera 2307, by using the shooting direction information and the viewing angle information of the camera 2307.

The server 300 may determine that the player B 2323 is in a shooting range of the camera 2305, by using the shooting direction information and the viewing angle information of the camera 2305, and transmit a video obtained by the camera 2305, to the electronic device 200.

According to another embodiment, the server 300 may determine whether the player selected by the user is included in videos obtained by the cameras 2301, 2303, 2305, and 2307, by processing the videos. Specifically, when the user selects a specific player through the electronic device 200, the electronic device 200 may transmit selection information of the specific player to the server 300. In this case, the selection information of the specific player may include a face image of the specific player or information for identifying the specific player. The server 300 may obtain a face image of the selected player based on the selection information of the specific player. The server 300 may determine a camera for providing a video of the specific player from among the videos obtained by the cameras 2301, 2303, 2305, and 2307, by using the face image of the selected player.

At least some parts of the device (e.g., modules or functions thereof) or the method (e.g., operations) according to an embodiment of the present disclosure may be implemented by instructions stored in a non-transitory computer-readable recording medium in the form of program modules. When the instructions are executed by a processor, the processor may perform functions corresponding to the instructions.

Herein, the programs may be stored in the non-transitory computer-readable recording medium and read and executed by a computer, thereby implementing the embodiment of the present disclosure.

The non-transitory computer-readable recording medium refers to a medium capable of semi-permanently storing data and being readable by a device, and may include volatile or non-volatile memory that temporarily stores data for calculation or transmission, e.g., a register, a cache, or a buffer.

However, temporary transmission media such as signals and current are not included in examples of the non-transitory computer-readable recording medium.

Specifically, the above programs may be stored and provided in the non-transitory computer-readable recording medium such as a compact disc (CD), a digital versatile disc (DVD), a hard disk, a Blu-ray disc, universal serial bus (USB) memory, embedded memory, a memory card, read-only memory (ROM), or random access memory (RAM).

In addition, the programs may be stored in memory of a server and transmitted to a terminal (e.g., the device of the present disclosure) connected to the server through a network for sale or be transferred to or registered in the server by a provider of the programs (e.g., a program developer or a program manufacturer). When the programs are sold from the server to the terminal, at least some parts of the programs may be temporarily stored in a buffer of the server for transmission. In this case, the buffer of the server may serve as the non-transitory computer-readable recording medium of the present disclosure.

According to an embodiment, the non-transitory computer-readable recording medium may store a program for instructing the electronic device of the present disclosure to determine a data providing time interval corresponding to a time interval at which multiple pieces of data included in streaming content are provided through a proxy module to an streaming application, to download a part of the streaming content, e.g., first data, from an external device and store the first data, and to provide the stored first data through the proxy module to the streaming application based on the determined data providing time interval when the streaming application requests the first data.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A video display method of an electronic device, the video display method comprising:
    transmitting, to a server, information on a type of electronic device;
    receiving, from the server, user interface (UI) information related to a plurality of objects including one or more movable objects and corresponding to the type of the electronic device;
    displaying, on a display, a first video obtained by photographing the plurality of objects including one or more movable objects, each movable object having a camera mounted thereon for photographing to obtain a corresponding second video;
    displaying, simultaneously with the displaying of the first video and based on the UI information, a UI including selectable UI elements representing each of the one or more movable objects, wherein the UI information includes UI element location information about locations on the UI of the UI elements, and the UI element location information includes information for mapping the locations on the UI of the UI elements to locations of the cameras mounted on the one or more movable objects based on camera location information transmitted by each of the cameras in synchronization with the corresponding second video;
    receiving user input for selecting at least one of the UI elements while the first video is being displayed on the display; and
    displaying the corresponding second video obtained by the camera mounted on the movable object corresponding to the selected UI element, on a part or an entirety of the display,
    wherein the camera location information indicates a current location of the each of the cameras mounted on the each movable object in a stadium map image,
    wherein the first video and the second video are displayed using the electronic device and another electronic device such that:
        the first video and the UI are displayed on the electronic device while the second video is displayed on the another electronic device; or
        the first video and the second video are displayed on the electronic device, while a UI for the first video and the second video are displayed on the another electronic device, and
    wherein the another electronic device is capable of communicating with the electronic device and displaying at least one of the first video or the second video.

2. The video display method of claim 1, wherein the UI information comprises at least one of uniform resource locator (URL) information of the second videos or identifier (ID) information of the cameras mounted on the movable objects.

3. The video display method of claim 1, wherein the displayed second video is obtained by stabilizing video data transmitted from the camera mounted on the movable object corresponding to the selected UI element, using motion information output from a sensor of the camera mounted on the movable object corresponding to the selected UI element.

4. The video display method of claim 1, further comprising displaying third video comprising the movable object corresponding to the selected UI element, on a part or the entirety of the display, based on the user input by finding the third video based on the camera location information of the camera mounted on the movable object corresponding to the selected UI element and location information of cameras mounted on other objects.

5. A video data processing method of a server, the method comprising:
    receiving, from each camera mounted on a respective one of one or more movable objects, video data, motion information transmitted in synchronization with the video data and generated based on motion of the respective camera, camera location information transmitted in synchronization with the video data and indicating a location the respective camera, and identifier (ID) information of the respective camera;

stabilizing the video data from each of the cameras based on the motion information, and generating corresponding second video data;
receiving, from an electronic device, information on a type of the electronic device;
generating, based on the information on the type of the electronic device, user interface (UI) information for a user interface (UI) including selectable UI elements representing each of the one or more movable objects, wherein the UI information includes UI element location information about locations on the UI of the UI elements, and the UI element location information includes information for mapping the locations on the UI of the UI elements to locations of the cameras mounted on the one or more movable objects based on the camera location information;
transmitting the UI information to the electronic device along with first video, the first video obtained by photographing the one or more movable objects;
receiving ID information for a camera associated with a UI element selected from the UI; and
transmitting second video data to the electronic device from the camera corresponding to the received ID information,
wherein the camera location information indicates a current location of the each of the cameras mounted on the each movable object in a stadium map image,
wherein the first video and the second video are displayed using the electronic device and another electronic device such that:
 the first video and the UI are displayed on the electronic device while the second video is displayed on the another electronic device; or
 the first video and the second video are displayed on the electronic device, while a UI for the first video and the second video are displayed on the another electronic device, and
wherein the another electronic device is capable of communicating with the electronic device and displaying at least one of the first video or the second video.

6. An electronic device comprising:
a communication unit including communication circuitry;
a display;
an input unit; and
a controller configured to:
 control the communication unit to transmit, to a server, information on a type of the electronic device;
 control the communication unit to receive, from the server, user interface (UI) information related to a plurality of objects including one or more movable objects and corresponding to the type of the electronic device;
 control the display to display a first video obtained by photographing the plurality of objects including one or more movable objects, each movable object having a camera mounted thereon for photographing to obtain a corresponding second video;
 control the display to display a UI simultaneously with the display of the first video, the UI based on the UI information and including selectable UI elements representing each of the one or more movable objects, wherein the UI information includes UI element location information about locations on the UI of the UI elements, and the UI element location information includes information for mapping the locations on the UI of the UI elements to locations of the cameras mounted on the one or more movable objects based on camera location information transmitted in synchronization with the corresponding second video;
 receive, through the input unit, user input for selecting at least one of the UI elements while the first video is being displayed on the display, and
 control the display to display the corresponding second video, on a part or an entirety of the display,
wherein the camera location information indicates a current location of the each of the cameras mounted on the each movable object in a stadium map image,
wherein the first video and the second video are displayed using the electronic device and another electronic device such that:
 the first video and the UI are displayed on the electronic device while the second video is displayed on the another electronic device; or
 the first video and the second video are displayed on the electronic device, while a UI for the first video and the second video are displayed on the another electronic device, and
wherein the another electronic device is capable of communicating with the electronic device and displaying at least one of the first video or the second video.

7. The electronic device of claim 6, wherein the UI information comprises at least one of uniform resource locator (URL) information of the second videos or identifier (ID) information of the cameras mounted on the movable objects.

8. The electronic device of claim 6, wherein the displayed second video is obtained by stabilizing video data transmitted from the camera mounted on the movable object corresponding to the selected UI element, using motion information output from a sensor of the camera mounted on the movable object corresponding to the selected UI element.

9. A non-transitory computer-readable recording medium having recorded thereon a computer program which, when executed by a processor of an electronic device, causes the electronic device to perform operations comprising:
transmitting, to a server, information on a type of the electronic device;
receiving, from the server, user interface (UI) information related to a plurality of objects including one or more movable objects and corresponding to the type of the electronic device;
displaying, on a display, a first video obtained by photographing the plurality of objects including the one or more movable objects, each movable object having a camera mounted thereon for photographing to obtain a corresponding second video;
displaying, simultaneously with the displaying of the first video and based on the UI information, a UI including selectable UI elements representing each of the one or more movable objects, wherein the UI information includes UI element location information about locations on the UI of the UI elements, and the UI element location information includes information for mapping the locations on the UI of the UI elements to locations of the cameras mounted on the one or more movable objects based on camera location information transmitted by each of the cameras in synchronization with the corresponding second video;
receiving user input for selecting at least one of the UI elements while the first video is being displayed on the display; and displaying the corresponding second video obtained by the camera mounted on the movable object corresponding to the selected UI element, on a part or an entirety of the display, wherein the camera location information indicates a current location of the each of the cameras mounted on the each movable object in a stadium map image, wherein the first video and the second video are displayed using the electronic device and another electronic device such that:

the first video and the UI are displayed on the electronic device while the second video is displayed on the another electronic device; or the first video and the second video are displayed on the electronic device, while a UI for the first video and the second video are displayed on the another electronic device, and wherein the another electronic device is capable of communicating with the electronic device and displaying at least one of the first video or the second video.

* * * * *